United States Patent
Kesho et al.

(10) Patent No.: US 8,786,534 B2
(45) Date of Patent: Jul. 22, 2014

(54) LIQUID CRYSTAL DISPLAY DEVICE

(75) Inventors: Masato Kesho, Kanazawa (JP);
Masanobu Nonaka, Nonoichi (JP);
Kazuhiro Takahashi, Kanazawa (JP);
Toshimasa Yonekura, Kanazawa (JP)

(73) Assignee: Japan Display Inc., Tokyo (JP)

(*) Notice: Subject to any disclaimer, the term of this patent is extended or adjusted under 35 U.S.C. 154(b) by 125 days.

(21) Appl. No.: 13/614,344

(22) Filed: Sep. 13, 2012

(65) Prior Publication Data

US 2013/0076611 A1 Mar. 28, 2013

(30) Foreign Application Priority Data

Sep. 27, 2011 (JP) ................. 2011-211080
Sep. 30, 2011 (JP) ................. 2011-217133

(51) Int. Cl.
*G09G 3/36* (2006.01)
*G02F 1/1343* (2006.01)

(52) U.S. Cl.
USPC ........................................... 345/92; 349/143

(58) Field of Classification Search
USPC ........................................... 345/92; 349/143
See application file for complete search history.

(56) References Cited

U.S. PATENT DOCUMENTS

| | | | |
|---|---|---|---|
| 6,266,116 B1 | 7/2001 | Ohta et al. | |
| 2001/0010575 A1 | 8/2001 | Yoshida et al. | |
| 2002/0057412 A1* | 5/2002 | Ashizawa et al. | 349/143 |
| 2004/0165136 A1 | 8/2004 | Sugiyama et al. | |
| 2005/0206824 A1 | 9/2005 | Son et al. | |
| 2005/0219453 A1 | 10/2005 | Kubo et al. | |
| 2007/0115234 A1 | 5/2007 | Kim et al. | |
| 2008/0062358 A1 | 3/2008 | Lee et al. | |
| 2008/0180590 A1 | 7/2008 | Lee et al. | |
| 2008/0180623 A1 | 7/2008 | Lee et al. | |
| 2008/0186439 A1 | 8/2008 | Kwon et al. | |
| 2008/0211974 A1* | 9/2008 | Ikebe | 349/143 |

FOREIGN PATENT DOCUMENTS

| | | |
|---|---|---|
| JP | 6-222397 | 8/1994 |
| JP | 7-159807 | 6/1995 |
| JP | 9-160041 | 6/1997 |
| JP | 9-160042 | 6/1997 |
| JP | 9-160061 | 6/1997 |
| JP | 10-26765 | 1/1998 |
| JP | 10-90708 | 4/1998 |
| JP | 2005-3802 | 1/2005 |
| JP | 3644653 | 2/2005 |
| JP | 2005-242307 | 9/2005 |
| JP | 2009-192822 | 8/2009 |

OTHER PUBLICATIONS

U.S. Appl. No. 13/676,566, filed Nov. 14, 2012, Kesho, et al.
U.S. Appl. No. 13/645,734, filed Oct. 5, 2012, Kesho, et al.

(Continued)

*Primary Examiner* — Kevin M Nguyen
(74) *Attorney, Agent, or Firm* — Oblon, Spivak, McClelland, Maier & Neustadt, L.L.P.

(57) ABSTRACT

According to one embodiment, a liquid crystal display device includes a first substrate including a first gate line and a second gate line, a storage capacitance line, a first source line and a second source line, a switching element, and a pixel electrode surrounded by the first gate line, the second gate line, the first source line and the second source line, the pixel electrode including a contact portion which is put in contact with the switching element, a first main pixel electrode and a second main pixel electrode, a second substrate including a common electrode and a liquid crystal layer held between the first substrate and the second substrate.

20 Claims, 12 Drawing Sheets

(56) References Cited

OTHER PUBLICATIONS

U.S. Appl. No. 13/548,644, filed Jul. 13, 2012, Kesho, et al.

U.S. Appl. No. 13/589,597, filed Aug. 20, 2012, Yonekura, et al.
U.S. Appl. No. 13/590,643, Aug. 21, 2012, Kesho, et al.
U.S. Appl. No. 13/603,942, filed Sep. 5, 2012, Kesho, et al.

* cited by examiner

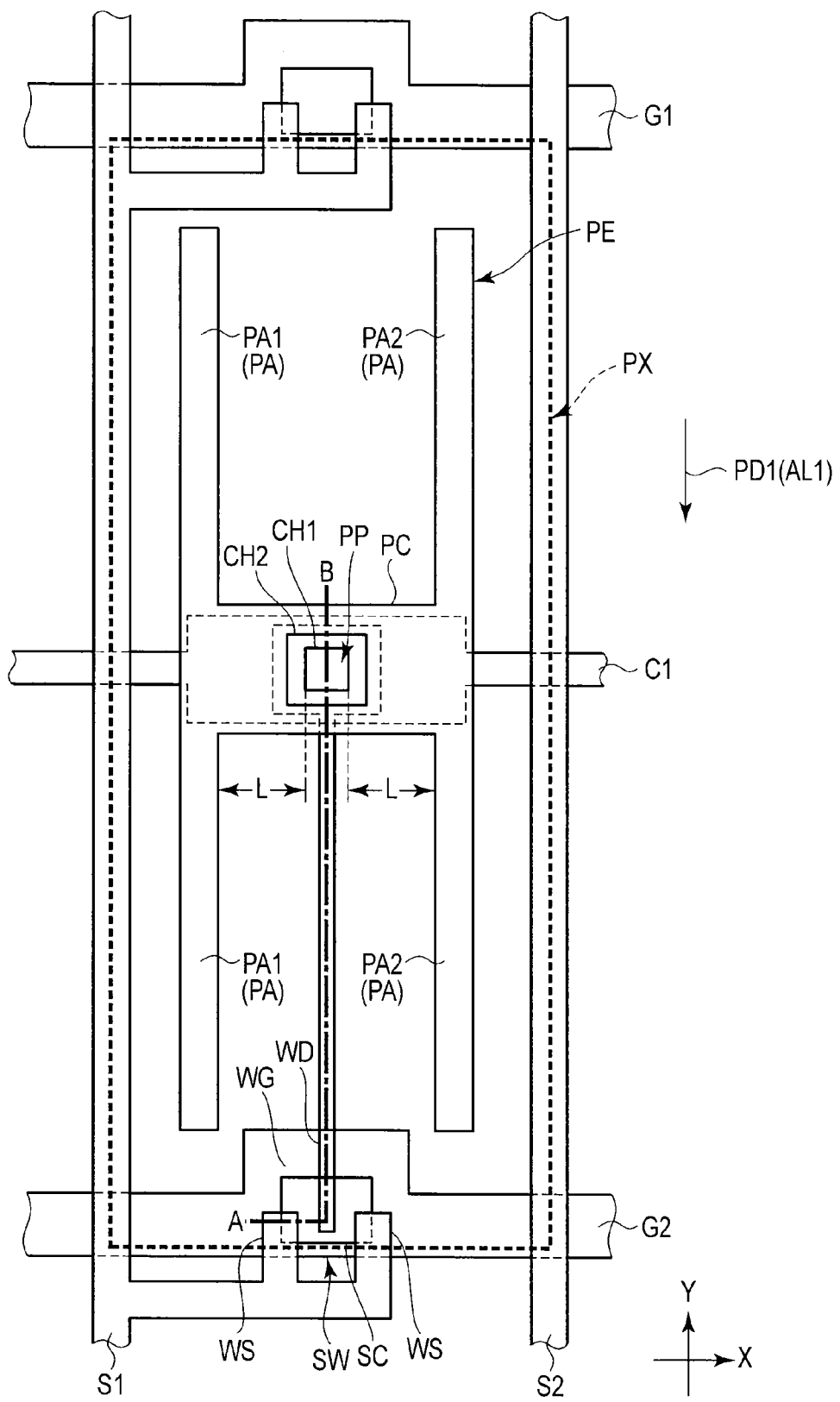
F I G. 2

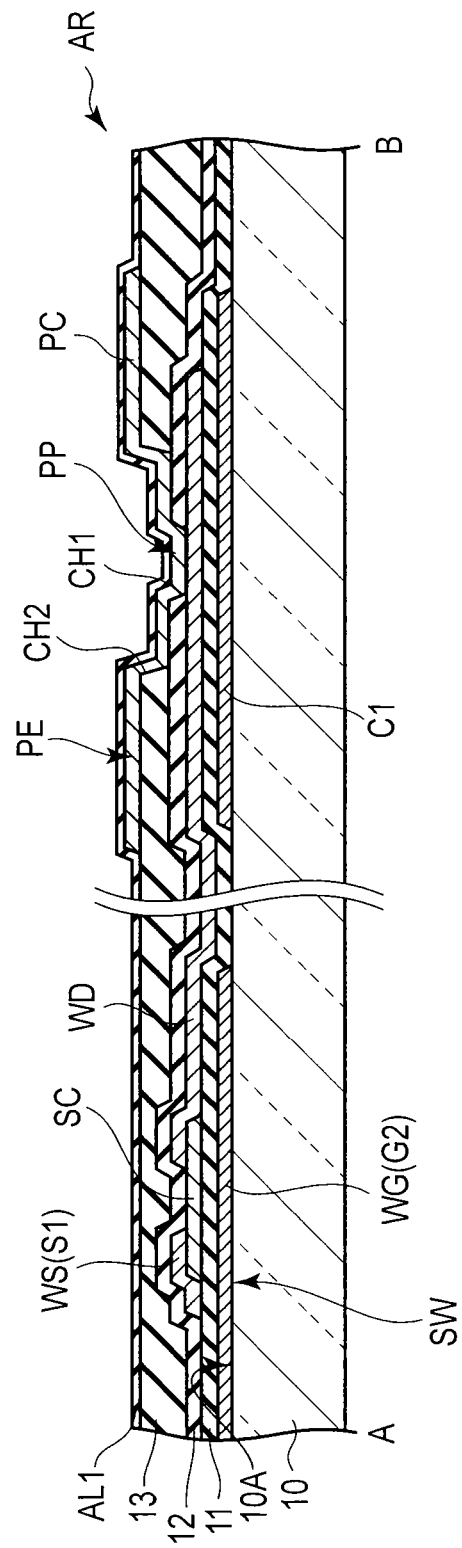
F I G. 4

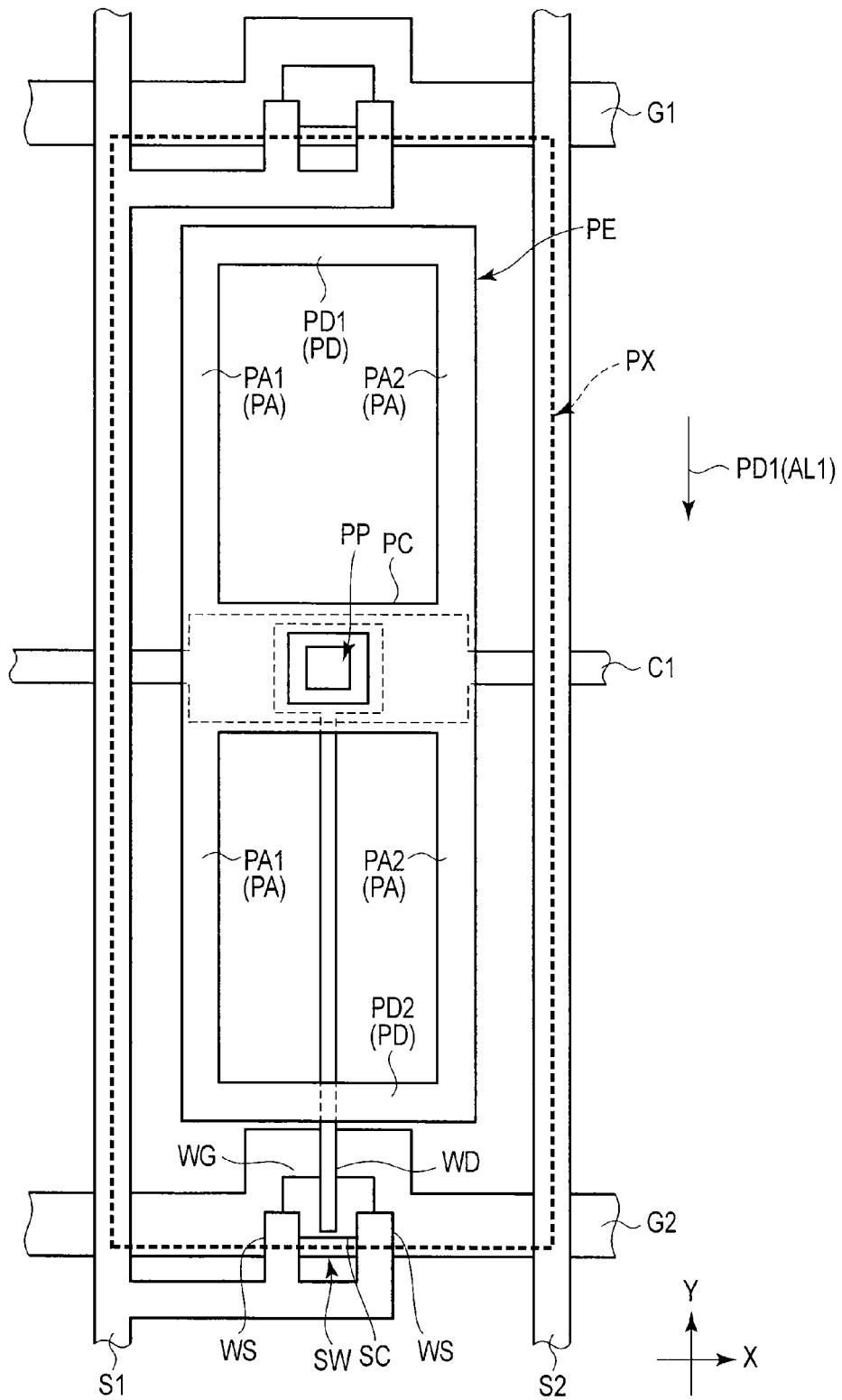
F I G. 6

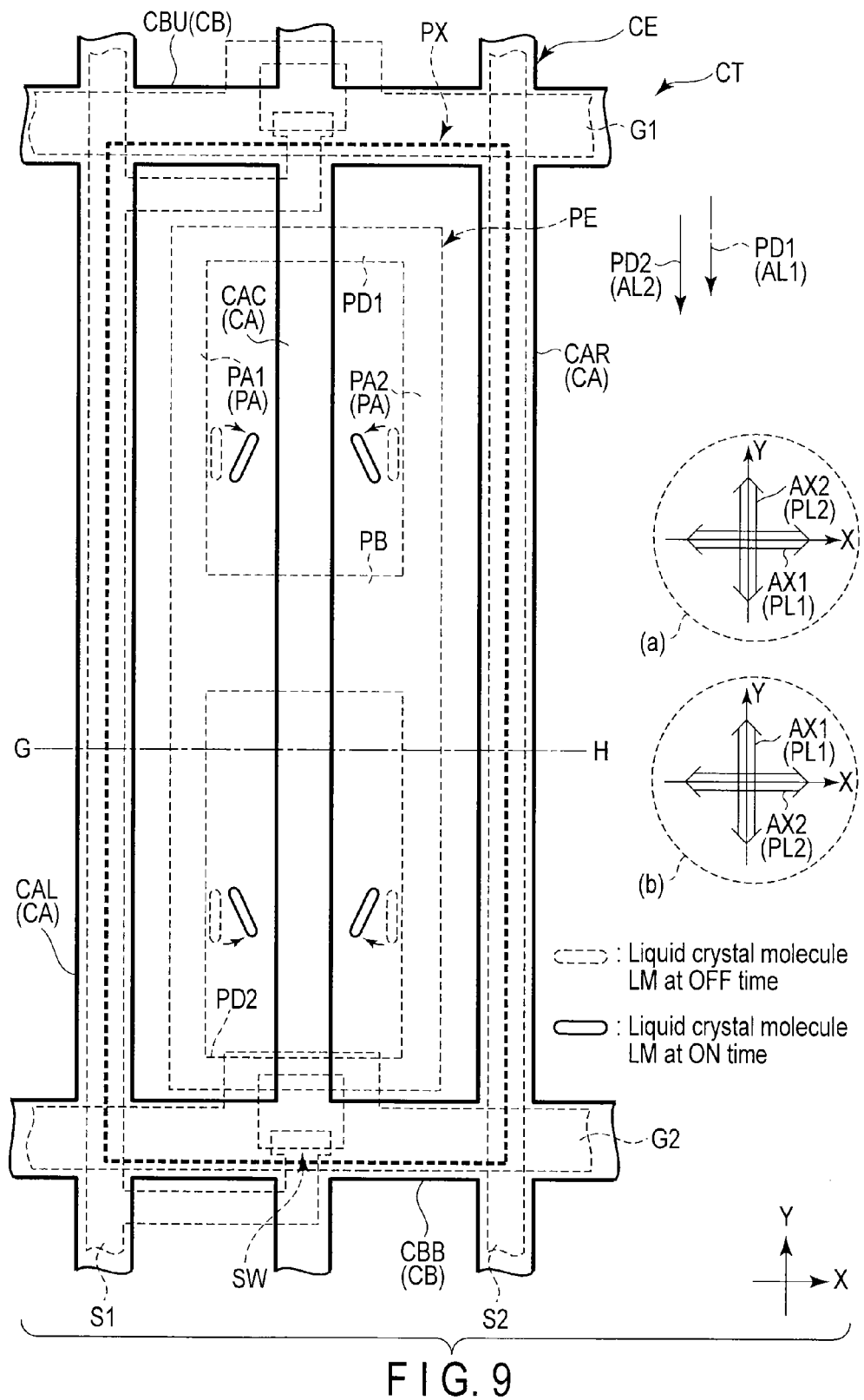
F I G. 9

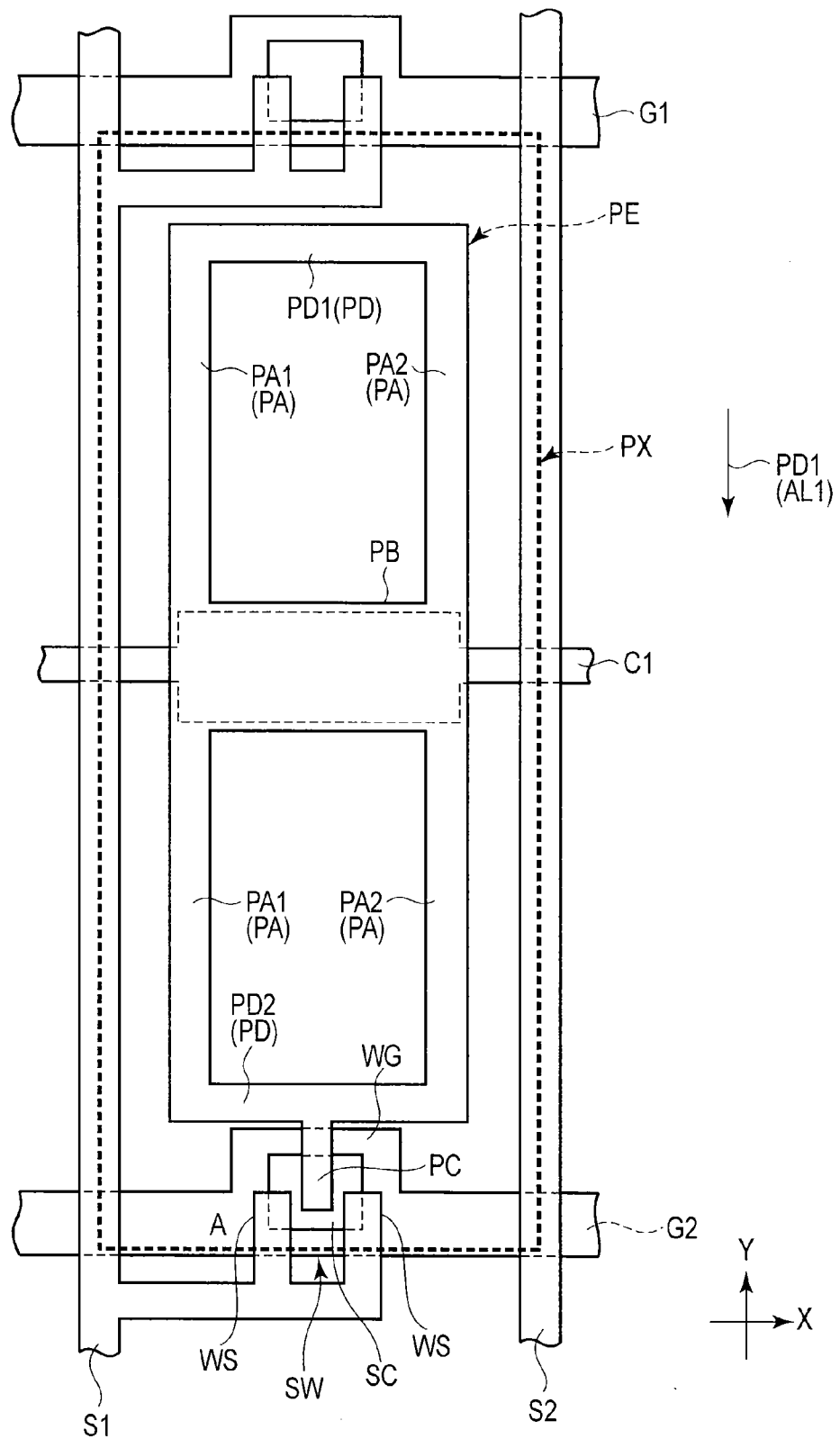
F I G. 12

LIQUID CRYSTAL DISPLAY DEVICE

CROSS-REFERENCE TO RELATED APPLICATIONS

This application is based upon and claims the benefit of priority from Japanese Patent Applications No. 2011-211080, filed Sep. 27, 2011; and No. 2011-217133, filed Sep. 30, 2011, the entire contents of all of which are incorporated herein by reference.

FIELD

Embodiments described herein relate generally to a liquid crystal display device.

BACKGROUND

In recent years, flat-panel display devices have been vigorously developed. By virtue of such advantageous features as light weight, small thickness and low power consumption, special attention has been paid to liquid crystal display devices among others. In particular, in active matrix liquid crystal devices in which switching elements are incorporated in respective pixels, attention is paid to the configuration which makes use of a lateral electric field (including a fringe electric field), such as an IPS (In-Plane Switching) mode or an FFS (Fringe Field Switching) mode. Such a liquid crystal display device of the lateral electric field mode includes pixel electrodes and a counter-electrode, which are formed on an array substrate, and liquid crystal molecules are switched by a lateral electric field which is substantially parallel to a major surface of the array substrate.

On the other hand, there has been proposed a technique wherein a lateral electric field or an oblique electric field is produced between a pixel electrode formed on an array substrate and a counter-electrode formed on a counter-substrate, thereby switching liquid crystal molecules.

BRIEF DESCRIPTION OF THE DRAWINGS

FIG. 2 is a plan view which schematically shows a structure example of a pixel at a time when an array substrate shown in FIG. 1 is viewed from a counter-substrate side.

FIG. 4 is a schematic cross-sectional view, taken along line A-B in FIG. 2, showing a cross-sectional structure of the array substrate shown in FIG. 2.

FIG. 6 is a plan view which schematically shows another structure example of the pixel at a time when the array substrate shown in FIG. 1 is viewed from the counter-substrate side.

FIG. 9 is a plan view which schematically shows a structure example of the pixel in the counter-substrate shown in FIG. 1.

FIG. 12 is a plan view which schematically shows another structure example of the pixel at a time when the array substrate shown in FIG. 1 is viewed from the counter-substrate side.

DETAILED DESCRIPTION

Figure 1:
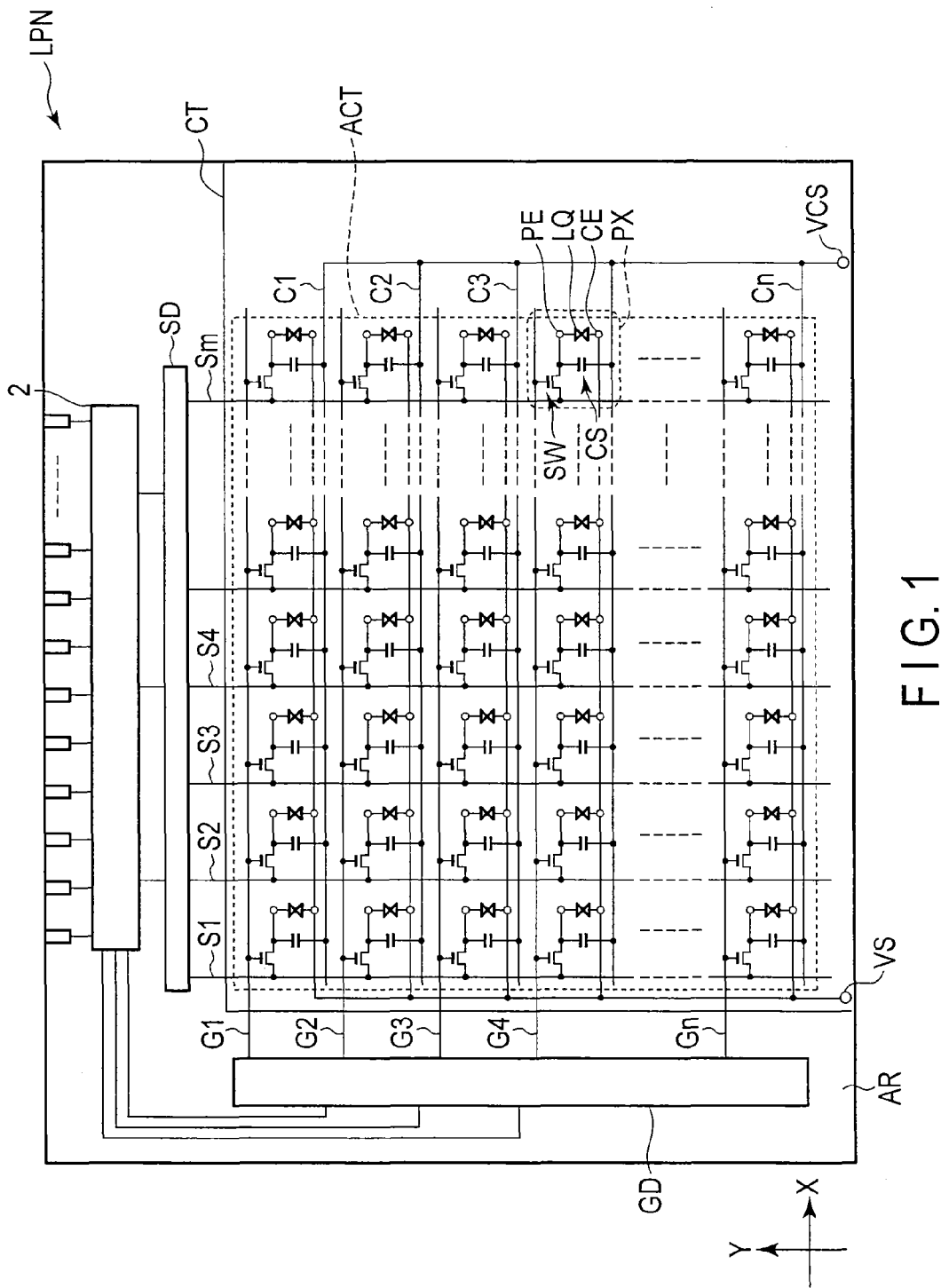
FIG. 1 is a view which schematically illustrates a structure and an equivalent circuit of a liquid crystal display device according to an embodiment.

In general, according to one embodiment, a liquid crystal display device includes: a first substrate including a first gate line and a second gate line which extend in a first direction and are disposed with a first pitch along a second direction crossing the first direction, a storage capacitance line which is located at a substantially middle point between the first gate line and the second gate line and extends in the first direction, a first source line and a second source line which extend in the second direction and are disposed with a second pitch, which is less than the first pitch, along the first direction, a switching element which is electrically connected to the first gate line and the first source line, and a pixel electrode surrounded by the first gate line, the second gate line, the first source line and the second source line, the pixel electrode including a contact portion which is located above the storage capacitance line, is put in contact with the switching element and extends in the first direction, a first main pixel electrode which is continuous with a part of the contact portion, which is located on the first source line side, and extends in the second direction, and a second main pixel electrode which is continuous with a part of the contact portion, which is located on the second source line side, and extends in the second direction; a second substrate including a common electrode including main common electrodes which are located between the first main pixel electrode and the second main pixel electrode, above the first source line, and above the second source line, respectively, and extend in the second direction; and a liquid crystal layer including liquid crystal molecules held between the first substrate and the second substrate.

According to another embodiment, a liquid crystal display device includes: a first substrate including a gate line and a storage capacitance line each extending in a first direction, a first insulation film covering the gate line and the storage capacitance line, a source line formed on the first insulation film and extending in a second direction crossing the first direction, a switching element electrically connected to the gate line and the source line, a second insulation film covering the source line and the switching element, a third insulation film covering the second insulation film, and a pixel electrode which is formed on the third insulation film and disposed in a pixel having a greater length in the second direction than in the first direction, the pixel electrode including a contact portion which is located above the storage capacitance line at a substantially central portion of the pixel, extends in the first direction, and is put in contact with the switching element via a first contact hole formed in the second insulation film and a second contact hole formed in the third insulation film, and a first main pixel electrode and a second main pixel electrode which are continuous with the contact portion and extend in the second direction; a second substrate including a common electrode including main common electrodes which are located between the first main pixel electrode and the second main pixel electrode, and above the source line, respectively, and extend in the second direction; and a liquid crystal layer including liquid crystal molecules held between the first substrate and the second substrate.

According to another embodiment, a liquid crystal display device includes: a first substrate including a first gate line and a second gate line which extend in a first direction, a storage capacitance line which is located at a substantially middle point between the first gate line and the second gate line and extends in the first direction, a first source line and a second source line which extend in a second direction crossing the first direction, and a pixel electrode formed of the same material as the first source line and the second source line, the pixel electrode including a sub-pixel electrode which is located above the storage capacitance line and extends in the first direction, a first main pixel electrode which is continuous with a part of the sub-pixel electrode, which is located on the first source line side, and extends in the second direction, and a second main pixel electrode which is continuous with a part of the sub-pixel electrode, which is located on the second source line side, and extends in the second direction; a second substrate including a common electrode including main common electrodes which are located between the first main pixel electrode and the second main pixel electrode, above the first source line, and above the second source line, respectively, and extend in the second direction; and a liquid crystal layer including liquid crystal molecules held between the first substrate and the second substrate.

Embodiments will now be described in detail with reference to the accompanying drawings. In the drawings, structural elements having the same or similar functions are denoted by like reference numerals, and an overlapping description is omitted.

FIG. 1 is a view which schematically shows a structure and an equivalent circuit of a liquid crystal display device according to an embodiment.

Specifically, the liquid crystal display device includes an active-matrix-type liquid crystal display panel LPN. The liquid crystal display panel LPN includes an array substrate AR which is a first substrate, a counter-substrate CT which is a second substrate that is disposed to be opposed to the array substrate AR, and a liquid crystal layer LQ which is held between the array substrate AR and the counter-substrate CT. The liquid crystal display panel LPN includes an active area ACT which displays an image. The active area ACT is composed of a plurality of pixels PX which are arrayed in a matrix of m×n (m and n are positive integers).

The liquid crystal display panel LPN includes, in the active area ACT, an n-number of gate lines G (G1 to Gn), an n-number of storage capacitance lines C (C1 to Cn), and an m-number of source lines S (S1 to Sm). The gate lines G and storage capacitance lines C correspond to signal lines which extend, for example, substantially linearly in a first direction X. The gate lines G and storage capacitance lines C neighbor at intervals along a second direction Y crossing the first direction X, and are alternately arranged in parallel. In this example, the first direction X and the second direction Y are substantially perpendicular to each other. The source lines S cross the gate lines G and storage capacitance lines C. The source lines S correspond to signal lines which extend substantially linearly along the second direction Y. It is not always necessary that each of the gate lines G, storage capacitance lines C and source lines S extend linearly, and a part thereof may be bent.

Each of the gate lines G is led out to the outside of the active area ACT and is connected to a gate driver GD. Each of the source lines S is led out to the outside of the active area ACT and is connected to a source driver SD. At least parts of the gate driver GD and source driver SD are formed on, for example, the array substrate AR, and are connected to a driving IC chip 2 which incorporates a controller.

Each of the pixels PX includes a switching element SW, a pixel electrode PE and a common electrode CE. A storage capacitance CS is formed, for example, between the storage capacitance line C and the pixel electrode PE. The storage capacitance line C is electrically connected to a voltage application module VCS to which a storage capacitance voltage is applied.

In the present embodiment, the liquid crystal display panel LPN is configured such that the pixel electrodes PE are formed on the array substrate AR, and at least a part of the common electrode CE is formed on the counter-substrate CT, and liquid crystal molecules of the liquid crystal layer LQ are switched by mainly using an electric field which is produced between the pixel electrodes PE and the common electrode CE. The electric field, which is produced between the pixel electrodes PE and the common electrode CE, is an oblique electric field which is slightly inclined to an X-Y plane, which is defined by the first direction X and second direction Y, or to a substrate major surface (or a lateral electric field which is substantially parallel to the substrate major surface).

The switching element SW is composed of, for example, an n-channel thin-film transistor (TFT). The switching element SW is electrically connected to the gate line G and source line S. The switching element SW may be of a top gate type or a bottom gate type. In addition, a semiconductor layer of the switching element SW is formed of, for example, amorphous silicon, but it may be formed of polysilicon.

The pixel electrodes PE are disposed in the respective pixels PX, and are electrically connected to the switching elements SW. The common electrode CE is disposed common to the pixel electrodes PE of plural pixels PX via the liquid crystal layer LQ. The pixel electrodes PE and common electrode CE are formed of a light-transmissive, electrically conductive material such as indium tin oxide (ITO) or indium zinc oxide (IZO). However, the pixel electrodes PE and common electrode CE may be formed of other metallic material such as aluminum.

The array substrate AR includes a power supply module VS for applying a voltage to the common electrode CE. The power supply module VS is formed, for example, on the outside of the active area ACT. The common electrode CE of the counter-substrate CT is led out to the outside of the active area ACT, and is electrically connected to the power supply module VS via an electrically conductive member (not shown).

FIG. 2 is a plan view which schematically shows a structure example of one pixel PX at a time when the array substrate AR shown in FIG. 1 is viewed from the counter-substrate side. FIG. 2 is a plan view in an X-Y plane.

The array substrate AR includes a gate line G1, a gate line G2, a storage capacitance line C1, a source line S1, a source line S2, a switching element SW, a pixel electrode PE, and a first alignment film AL1.

In the example illustrated, as indicated by a broken line in FIG. 2, the pixel PX has a vertically elongated rectangular shape having a less length in the first direction X than in the second direction Y. The gate line G1 and gate line G2 are disposed with a first pitch along the second direction Y, and each of the gate line G1 and gate line G2 extends in the first direction X. The storage capacitance line C1 is disposed between the gate line G1 and gate line G2, and extends in the first direction X. The source line S1 and source line S2 are disposed with a second pitch along the first direction X, and extend in the second direction Y.

In the pixel PX illustrated, the source line S1 is disposed at a left side end portion, the source line S2 is disposed at a right side end portion, the gate line G1 is disposed at an upper side end portion, and the gate line G2 is disposed at a lower side end portion. Strictly speaking, the source line S1 is disposed to extend over a boundary between the pixel PX and a pixel neighboring on the left side, the source line S2 is disposed to extend over a boundary between the pixel PX and a pixel neighboring on the right side, the gate line G1 is disposed to extend over a boundary between the pixel PX and a pixel neighboring on the upper side, and the gate line G2 is disposed to extend over a boundary between the pixel PX and a pixel neighboring on the lower side. Specifically, the length of the pixel PX in the first direction X corresponds to the second pitch between the source lines, and the length of the pixel PX in the second direction Y corresponds to the first pitch between the gate lines. The first pitch is greater than the second pitch.

In addition, in the pixel PX illustrated, the storage capacitance line C1 is disposed at a substantially middle point between the gate line G2 and gate line G1. Specifically, the distance in the second direction Y between the storage capacitance line C1 and the gate line G1 is substantially equal to the distance in the second direction Y between the storage capacitance line C1 and the gate line G2.

The switching element SW, in the illustrated example, is electrically connected to the gate line G2 and source line S1. The switching element SW is provided in a region at a substantially middle point between the source line S1 and source line S2, on a lower side of the pixel PX. The switching element SW includes a gate electrode WG which is electrically connected to the gate line G2, a semiconductor layer SC which is formed of amorphous silicon immediately above the gate electrode WG, a source electrode WS which is electrically connected to the source line S1 and is put in contact with the semiconductor layer SC, and a drain electrode WD which is put in contact with the semiconductor layer SC. In the example illustrated, the gate electrode WG is formed integral with the gate line G2, and the source electrode WS is formed integral with the source line S1. In addition, the drain electrode WD extends in the second direction Y to a substantially central portion of the pixel PX from a position of contact with the semiconductor layer SC that is disposed in the vicinity of the lower side end portion of the pixel PX. The drain electrode WD is disposed between the source line S1 and source line S2, or between a main pixel electrode PA1 and a main pixel electrode PA2 of the pixel electrode PE (to be described later), and extends in the second direction Y. In addition, the drain electrode WD extends in the second direction Y immediately below a main common electrode CA located between the main pixel electrode PA1 and main pixel electrode PA2 (to be described later).

The pixel electrode PE is disposed between the source line S1 and source line S2 which neighbor each other, and between the gate line G1 and gate line G2. Specifically, the pixel electrode PE is located within an inside surrounded by the source line S1, source line S2, gate line G1 and gate line G2.

The pixel electrode PE includes a main pixel electrode PA and a contact portion PC. The main pixel electrode PA and contact portion PC are electrically connected to each other.

The contact portion PC is put in contact with the switching element SW at a contact position PP. Specifically, the contact portion PC is located at a substantially central portion of the pixel PX, and extends in the first direction X. The contact portion PC is electrically connected to the drain electrode WD via a contact hole CH1 and a contact hole CH2 at the contact position PP that is located immediately above the drain electrode WD. The contact portion PC is formed in a strip shape having a substantially uniform width in the second direction Y.

Two or more main pixel electrodes PA are provided in one pixel electrode PE. The main pixel electrodes PA extend in the second direction Y from the contact portion PC. Each main pixel electrode PA is formed in a strip shape having a substantially uniform width in the first direction X. The main pixel electrodes PA are formed integral or continuous with the contact portion PC, and are electrically connected to the contact portion PC.

In the example illustrated, the pixel electrode PE includes two main pixel electrodes, namely a main pixel electrode PA1 and a main pixel electrode PA2. The main pixel electrode PA1 is located on the source line S1 side of the contact position PP. The main pixel electrode PA1 is continuous with that part of the contact portion PC, which is located on the source line S1 side. The main pixel electrode PA2 is located on the source line S2 side of the contact position PP. The main pixel electrode PA2 is continuous with that part of the contact portion PC, which is located on the source line S2 side. The main pixel electrode PA1 and main pixel electrode PA2 linearly extend in the second direction Y from the contact portion PC toward an upper side end portion of the pixel PX (i.e. toward the gate line G1) and a lower side end portion of the pixel PX (i.e. toward the gate line G2), respectively. As regards the main pixel electrode PA1, the length of extension from the contact portion PC toward the gate line G1 is substantially equal to the length of extension from the contact portion PC toward the gate line G2. Similarly, as regards the main pixel electrode PA2, the length of extension from the contact portion PC toward the gate line G1 is substantially equal to the length of extension from the contact portion PC toward the gate line G2. Specifically, the contact portion PC connects a substantially middle position of the main pixel electrode PA1 and a substantially middle position of the main pixel electrode PA2. The pixel electrode PE with this structure has an H shape.

In the pixel electrode PE, a distance L in the first direction X from the contact position PP to the main pixel electrode PA1 is equal to a distance L in the first direction X from the contact position PP to the main pixel electrode PA2. Specifically, the contact position PP is equidistant from both the main pixel electrode PA1 and main pixel electrode PA2 in the first direction X. In addition, the contact position PP is equidistant from both the source line S1 and source line S2 in the first direction X. Besides, the contact position PP is equidistant from both the gate line G1 and gate line G2 in the second direction Y.

The contact portion PC is located above the storage capacitance line C1 at a substantially central portion of the pixel PX. Specifically, the pixel electrode PE is opposed to the storage capacitance line C1 at the contact portion PC, and forms a capacitance which is necessary for image display in the pixel PX. In the meantime, in order to form a greater capacitance, a part of the main pixel electrode PA, in addition to the contact portion PC, may be located above the storage capacitance line C1.

Incidentally, the array substrate AR may further includes a part of the common electrode CE.

In the array substrate AR, the pixel electrode PE is covered with the first alignment film AL1. The first alignment film AL1 is subjected to alignment treatment (e.g. rubbing treatment or optical alignment treatment) in a first alignment treatment direction PD1 for initially aligning the liquid crystal molecules of the liquid crystal layer LQ. The first alignment treatment direction PD1, in which the first alignment film AL1 initially aligns the liquid crystal molecules, is substantially parallel to the second direction Y that is the direction of extension of the main pixel electrode PA.

Examples of dimensions are described. The first pitch of gate lines G, i.e. the distance between the gate line G1 and gate line G2 in the second direction Y, is 150 µm to 180 µm. The second pitch of source lines S, i.e. the distance between the source line S1 and source line S2 in the first direction X, is 50 µm to 60 µm. The width of each of the gate line G and storage capacitance line C in the second direction Y is 5 µm. The width of the main pixel electrode PA in the first direction X is 5 µm. The width of the source line S in the first direction X is 3 µm. In the meantime, the gate line G and storage capacitance line C are formed in the same layer and need to be electrically insulated, and therefore a margin of, e.g. 10 µm is secured therebetween.

Figure 3:
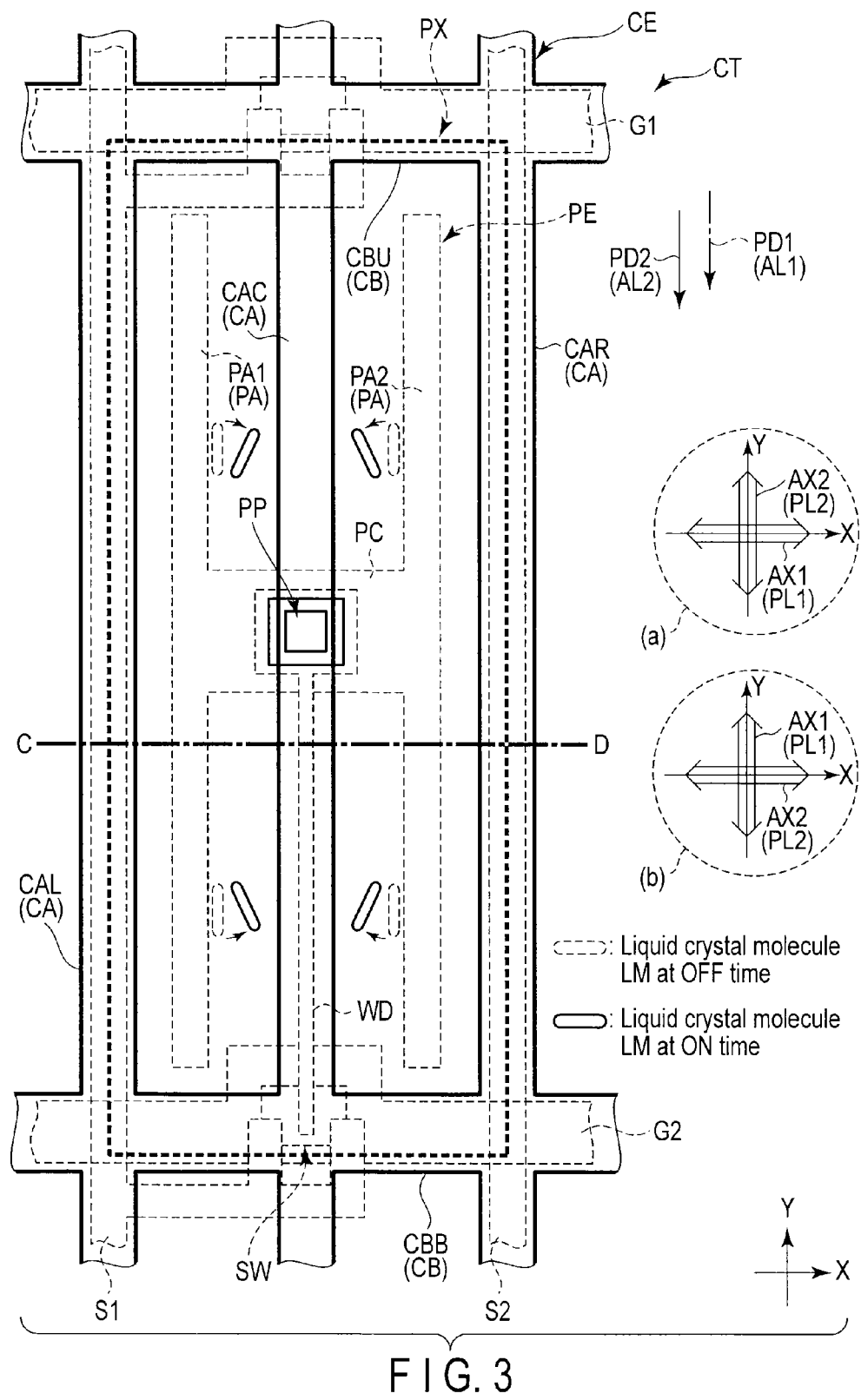
FIG. 3 is a plan view which schematically shows a structure example of a pixel in a counter-substrate shown in FIG. 1.

FIG. 3 is a plan view which schematically shows a structure example of one pixel PX in the counter-substrate CT shown in FIG. 1. FIG. 3 shows a plan view in the X-Y plane. FIG. 3 shows only structural parts that are necessary for the description, and the pixel electrode PE, source lines S and gate lines G, which are provided on the array substrate, are indicated by broken lines.

The common electrode CE includes a main common electrode CA on the counter-substrate CT. In the example illustrated, the common electrode CE further includes a sub-common electrode CB on the counter-substrate CT. The main common electrode CA and sub-common electrode CB are electrically connected to each other. The sub-common electrode CB, however, may be omitted.

In the X-Y plane, the main common electrode CA linearly extends in the second direction Y that is substantially parallel to the direction of extension of the main pixel electrodes PA, on both sides of each of the main pixel electrode PA1 and main pixel electrode PA2. Alternatively, the main common electrode CA is disposed, one by one, above each source line S and between the main pixel electrodes PA, and extends in the second direction Y that is substantially parallel to the direction of extension of the main pixel electrodes PA. The main common electrode CA is formed in a strip shape with a substantially uniform width in the first direction X.

In the example illustrated, three main common electrodes CA are arranged in parallel at intervals in the first direction X. Specifically, in each pixel, three main common electrodes CA are arranged with equal pitches in the first direction X. In the pixel PX, a main common electrode CAL is disposed at a left side end portion, a main common electrode CAR is disposed at a right side end portion, and a main common electrode CAC is disposed at a central portion of the pixel. Strictly speaking, the main common electrode CAL is disposed to extend over a boundary between the pixel PX and a pixel neighboring on the left side, and the main common electrode CAR is disposed to extend over a boundary between the pixel PX and a pixel neighboring on the right side. The main common electrode CAL is located above the source line S1, the main common electrode CAR is located above the source line S2, and the main common electrode CAC extends above the contact position PP and is located between the main pixel electrode PA1 and main pixel electrode PA2. The drain electrode WD of the switching element SW extends in the second direction Y, immediately below the main common electrode CAC.

The main common electrode CAL and main common electrode CAC are located on both sides of the main pixel electrode PA1. Similarly, the main common electrode CAC and main common electrode CAR are located on both sides of the main pixel electrode PA2. In other words, the main common electrode CAC, which is disposed at the central portion of the pixel, is located at a substantially middle point between the main pixel electrode PA1 and main pixel electrode PA2. Specifically, in the X-Y plane, the main common electrodes CA and main pixel electrodes PA are alternately arranged in the first direction X. In the example illustrated, the main common electrode CAL, main pixel electrode PA1, main common electrode CAC, main pixel electrode PA2 and main common electrode CAR are arranged in the named order. In the meantime, the inter-electrode distance in the first direction X between the main pixel electrode PA1 and main common electrode CAC is substantially equal to the inter-electrode distance in the first direction X between the main common electrode CAC and main pixel electrode PA2. In addition, the inter-electrode distance in the first direction X between the main common electrode CAL and main pixel electrode PA1 is substantially equal to the inter-electrode distance in the first direction X between the main pixel electrode PA2 and main common electrode CAR.

The sub-common electrode CB linearly extends, in the X-Y plane, in the first direction X on both sides of the pixel electrode PE. Alternatively, the sub-common electrode CB is located above each of the gate lines G, is continuous with the main common electrode CA and linearly extends in the first direction X. The sub-common electrode CB is formed in a strip shape with a substantially uniform width in the second direction Y. In addition, the sub-common electrode CB is formed integral or continuous with the main common electrode CA, and is electrically connected to the main common electrode CA. Specifically, in the counter-substrate CT, the common electrode CE is formed in a grid shape surrounding the pixel electrode PE.

In the example illustrated, two sub-common electrodes CB are arranged in parallel with a distance in the second direction Y, and are disposed at both upper and lower end portions of the pixel PX. Specifically, in each pixel, two sub-common electrodes CB are disposed. In the pixel PX illustrated, a sub-common electrode CBU is disposed at an upper side end portion, and a sub-common electrode CBB is disposed at a lower side end portion. Strictly speaking, the sub-common electrode CBU is disposed to extend over a boundary between the pixel PX and a pixel neighboring on the upper side, and the sub-common electrode CBB is disposed to extend over a boundary between the pixel PX and a pixel neighboring on the lower side. The sub-common electrode CBU is located above the gate line G1, and the sub-common electrode CBB is located above the gate line G2.

In the counter-substrate CT, the common electrode CE is covered with a second alignment film AL2. The second alignment film AL2 is subjected to alignment treatment (e.g. rubbing treatment or optical alignment treatment) in a second alignment treatment direction PD2 for initially aligning the liquid crystal molecules of the liquid crystal layer LQ. The second alignment treatment direction PD2, in which the second alignment film AL2 initially aligns the liquid crystal molecules, is parallel to the first alignment treatment direction PD1, and is identical or opposite to the first alignment treatment direction PD1. In the example illustrated, the second alignment treatment direction PD2 is parallel to the second direction Y, and is parallel and identical to the first alignment treatment direction PD1 in the X-Y plane.

FIG. 4 is a schematic cross-sectional view, taken along line A-B in FIG. 2, showing a cross-sectional structure of the array substrate AR shown in FIG. 2.

The array substrate AR is formed by using a first insulative substrate 10 having light transmissivity. The array substrate AR includes, on the first insulative substrate 10, a switching element SW, a storage capacitance line C1, a pixel electrode PE, a first insulation film 11, a second insulation film 12, a third insulation film 13, and a first alignment film AL1.

A gate electrode WG of the switching element SW is a part of the gate line G2, and is formed on an inner surface 10A of the first insulative substrate 10. The storage capacitance line C1 is formed on the inner surface 10A of the first insulative substrate 10. The gate electrode WG, gate lines G and storage capacitance line C are formed of the same material. The gate electrode WG, which is integral with the gate line G2, and the storage capacitance line C1 are covered with the first insulation film 11.

A semiconductor layer SC of the switching element SW is formed on the first insulation film 11 and is located immediately above the gate electrode WG. A source electrode WS of the switching element SW is a part of the source line S1, is formed on the first insulation film 11, and is put in contact with the semiconductor layer SC. A drain electrode WD of the switching element SW is formed on the first insulation film 11 and is put in contact with the semiconductor layer SC. The source electrode WS and drain electrode WD are formed of the same material as the source line. The semiconductor layer SC, source electrode WS and drain electrode WD are covered with the second insulation film 12. A contact hole CH1, which penetrates to the drain electrode WD, is formed in the second insulation film 12.

The third insulation film 13 is formed on the second insulation film 12. The third insulation film 13 is formed by using, for example, an organic material, and the surface thereof is planarized. A contact hole CH2 is formed in the third insulation film 13. The contact hole CH2 has a greater size than the contact hole CH1, penetrates to the drain electrode WD in the contact hole CH1, and penetrates to the second insulation film 12 at the periphery of the contact hole CH1.

The pixel electrode PE is formed on the third insulation film 13, and the contact portion PC thereof is put in contact with the drain electrode WD via the contact hole CH1 and contact hole CH2. The contact position PP of the pixel electrode PE corresponds to a position where the contact portion PC is in contact with the drain electrode WD via the contact hole CH1. A part of the pixel electrode PE is opposed to the storage capacitance line C1 via the first insulation film 11, second insulation film 12 and third insulation film 13.

The first alignment film AL1 covers the pixel electrode PE, etc., and is also disposed over the third insulation film 13. The first alignment film AL1 is formed of a material which exhibits horizontal alignment properties.

Figure 5:
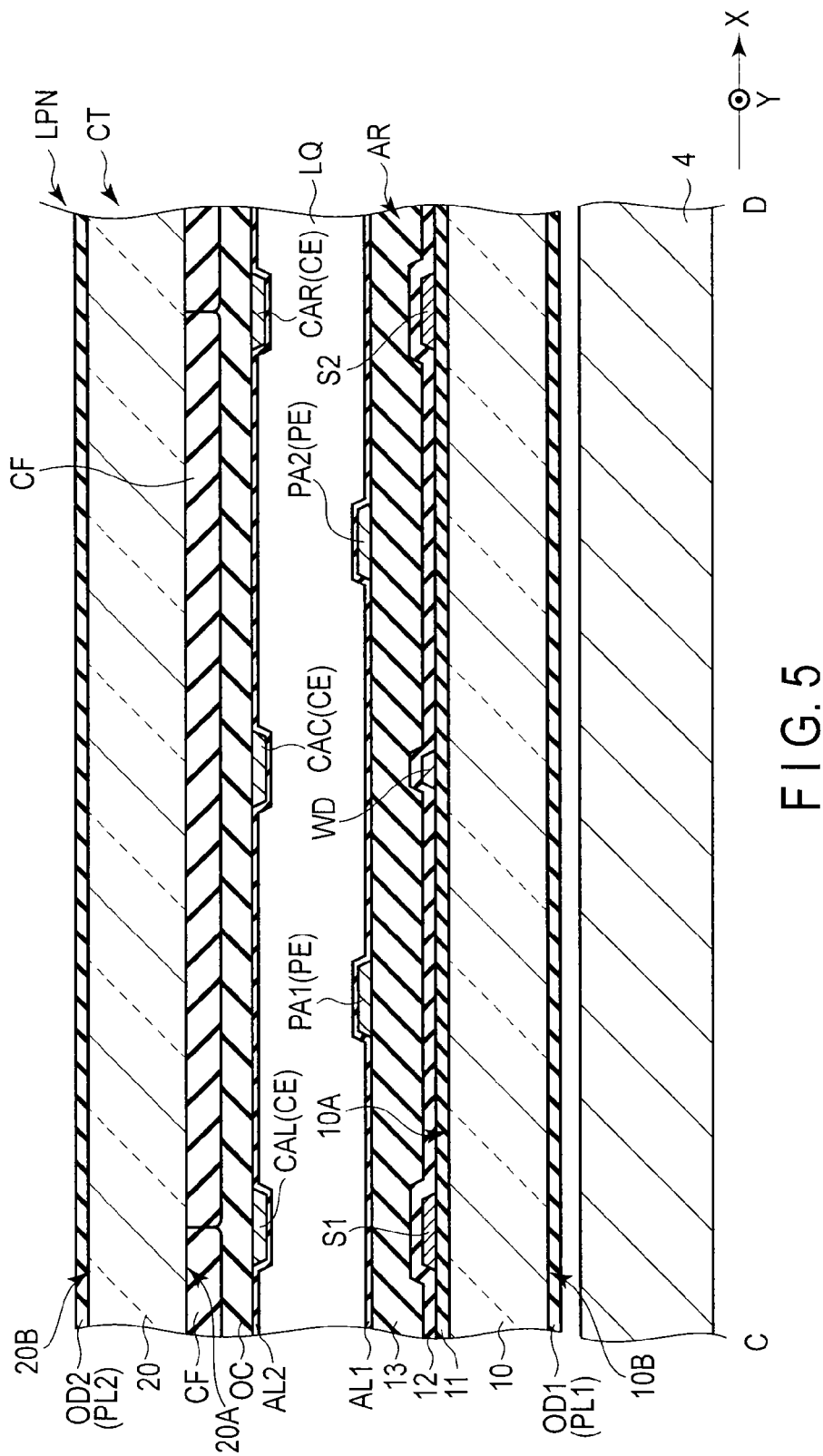
FIG. 5 is a schematic cross-sectional view, taken along line C-D in FIG. 3, showing a cross-sectional structure of a liquid crystal display panel shown in FIG. 3.

FIG. 5 is a schematic cross-sectional view, taken along line C-D in FIG. 3, showing a cross-sectional structure of the liquid crystal display panel LPN shown in FIG. 3.

A backlight 4 is disposed on the back side of the array substrate AR which constitutes the liquid crystal display panel LPN. Various modes are applicable to the backlight 4. As the backlight 4, use may be made of either a backlight which utilizes a light-emitting diode (LED) as a light source, or a backlight which utilizes a cold cathode fluorescent lamp (CCFL) as a light source. A description of the detailed structure of the backlight 4 is omitted.

In the array substrate AR, the first insulation film 11 is formed on the inner surface 10A of the first insulation film 10, that is, on the side thereof facing the counter-substrate CT. The source line S1 and source line S2 are formed on the first insulation film 11 and are covered with the second insulation film 12. The drain electrode WD is formed on the first insulation film 11 and is covered with the second insulation film 12. The drain electrode WD is located between the source line S1 and source line S2. The main pixel electrode PA1 and main pixel electrode PA2 are formed on the third insulation film 13, and are covered with the first alignment film AL1. The main pixel electrode PA1 and main pixel electrode PA2 are located on both sides of the drain electrode WD, and are located inside the positions immediately above the source line S1 and source line S2. The first alignment film AL1 is disposed on that surface of the array substrate AR, which is opposed to the counter-substrate CT, and the first alignment film AL1 extends over substantially the entirety of the active area ACT.

The counter-substrate CT is formed by using a second insulative substrate 20 having light transmissivity. The counter-substrate CT includes, on the inside of the second insulative substrate 20, that is, on the side thereof facing the array substrate AR, a color filter CF, an overcoat layer OC, a common electrode CE, and a second alignment film AL2. In the meantime, a black matrix, which partitions the pixels PX, may be disposed an inner surface 20A of the second insulative substrate 20, which is opposed to the array substrate AR.

The color filter CF is disposed in association with each pixel PX. Specifically, the color filter CF is disposed on the inner surface 20A of the second insulative substrate 20. Color filters CF, which are disposed in the pixels PX neighboring in the first direction X, have mutually different colors. For example, the color filters CF are formed of resin materials which are colored in three primary colors of red, blue and green. A red color filter, which is formed of a resin material that is colored in red, is disposed in association with a red pixel. A blue color filter, which is formed of a resin material that is colored in blue, is disposed in association with a blue pixel. A green color filter, which is formed of a resin material that is colored in green, is disposed in association with a green pixel.

The overcoat layer OC covers the color filters CF. The overcoat layer OC reduces the effect of asperities on the surfaces of the color filters CF. The overcoat layer OC is formed of a transparent resin material.

The main common electrode CAL, main common electrode CAC and main common electrode CAR of the common electrode CE, and the sub-common electrode CB (not shown) are formed on that side of the overcoat layer OC, which is opposed to the array substrate AR. The main common electrode CAL is located immediately above the source line S1. The main common electrode CAR is located immediately above the source line S2. The main common electrode CAC is located between the main common electrode CAL and main common electrode CAR or between the main pixel electrode PA1 and main pixel electrode PA2, and is located immediately above the drain electrode WD.

The regions between the pixel electrode PE and the common electrode CE, namely a region between the main common electrode CAL and main pixel electrode PA1, a region between the main common electrode CAC and main pixel electrode PA1, a region between the main common electrode CAC and main pixel electrode PA2 and a region between the main common electrode CAR and main pixel electrode PA2, correspond to transmissive regions through which light can pass.

The second alignment film AL2 is disposed on that surface of the counter-substrate CT, which is opposed to the array substrate AR, and the second alignment film AL2 extends over substantially the entirety of the active area ACT. The second alignment film AL2 covers the common electrode CE and overcoat layer OC. The second alignment film AL2 is formed of a material which exhibits horizontal alignment properties.

The above-described array substrate AR and counter-substrate CT are disposed such that their first alignment film AL1 and second alignment film AL2 are opposed to each other. In this case, columnar spacers, which are formed of, e.g. a resin material so as to be integral to one of the array substrate AR and counter-substrate CT, are disposed between the first alignment film AL1 of the array substrate AR and the second alignment film AL2 of the counter-substrate CT. Thereby, a predetermined cell gap, for example, a cell gap of 2 to 7 µm, is created. The array substrate AR and counter-substrate CT are attached by a sealant on the outside of the active area ACT in the state in which the predetermined cell gap is created therebetween.

The liquid crystal layer LQ is held in the cell gap which is created between the array substrate AR and the counter-substrate CT, and is disposed between the first alignment film AL1 and second alignment film AL2. The liquid crystal layer LQ is composed of a liquid crystal material having a positive (positive-type) dielectric constant anisotropy.

The distance in the first direction X between the main pixel electrode PA and main common electrode CA is greater than the thickness of the liquid crystal layer LQ, and is double or more the thickness of the liquid crystal layer LQ.

A first optical element OD1 is attached by, e.g. an adhesive, to an outer surface of the array substrate AR, that is, an outer surface 10B of the first insulative substrate 10. The first optical element OD1 is located on that side of the liquid crystal display panel LPN, which is opposed to the backlight 4, and controls the polarization state of incident light which enters the liquid crystal display panel LPN from the backlight 4. The first optical element OD1 includes a first polarizer PL1 having a first polarization axis AX1. In the meantime, another optical element, such as a retardation plate, may be disposed between the first polarizer PL1 and the first insulative substrate 10.

A second optical element OD2 is attached by, e.g. an adhesive, to an outer surface of the counter-substrate CT, that is, an outer surface 20B of the second insulative substrate 20. The second optical element OD2 is located on the display surface side of the liquid crystal display panel LPN, and controls the polarization state of emission light emerging from the liquid crystal display panel LPN. The second optical element OD2 includes a second polarizer PL2 having a second polarization axis AX2. In the meantime, another optical element, such as a retardation plate, may be disposed between the second polarizer PL2 and the second insulative substrate 20.

The first polarization axis AX1 of the first polarizer PL1 and the second polarization axis AX2 of the second polarizer PL2 have a substantially orthogonal positional relationship (crossed Nicols). In this case, one of the polarizers is disposed such that the polarization axis thereof is substantially parallel or substantially perpendicular to the direction of extension of the main pixel electrode PA or main common electrode CA. Specifically, when the direction of extension of the main pixel electrode PA or main common electrode CA is the second direction Y, the polarization axis of one of the polarizers is substantially parallel to the first direction X, or is substantially perpendicular to the first direction X. Alternatively, one of the polarizers is disposed such that the polarization axis thereof is parallel or perpendicular to the direction of initial alignment of liquid crystal molecules, that is, the first alignment treatment direction PD1 or second alignment treatment direction PD2. When the initial alignment direction is parallel to the second direction Y, the polarization axis of one polarizer is parallel to the first direction X or is parallel to the second direction Y.

In an example shown in part (a) of FIG. 3, the first polarizer PL1 is disposed such that the first polarization axis AX1 thereof is parallel to the first direction X, and the second polarizer PL2 is disposed such that the second polarization axis AX2 thereof is parallel to the second direction Y. In addition, in an example shown in part (b) of FIG. 3, the second polarizer PL2 is disposed such that the second polarization axis AX2 thereof is parallel to the first direction X, and the first polarizer PL1 is disposed such that the first polarization axis AX1 thereof is parallel to the second direction Y.

Next, the operation of the liquid crystal display panel LPN having the above-described structure is described with reference to FIG. 2 to FIG. 5.

Specifically, in a state in which no voltage is applied to the liquid crystal layer LQ, that is, in a state (OFF time) in which no electric field is produced between the pixel electrode PE and common electrode CE, the liquid crystal molecule LM of the liquid crystal layer LQ is aligned such that the major axis thereof is positioned in the first alignment treatment direction PD1 of the first alignment film AL1 and the second alignment treatment direction PD2 of the second alignment film AL2. This OFF time corresponds to the initial alignment state, and the alignment direction of the liquid crystal molecule LM at the OFF time corresponds to the initial alignment direction.

Strictly speaking, the liquid crystal molecule LM is not always aligned in parallel to the X-Y plane, and, in many cases, the liquid crystal molecule LM is pre-tilted. Thus, the initial alignment direction of the liquid crystal molecule LM corresponds to a direction in which the major axis of the liquid crystal molecule LM at the OFF time is orthogonally projected onto the X-Y plane. In the description below, for the purpose of simplicity, it is assumed that the liquid crystal molecule LM is aligned in parallel to the X-Y plane, and the liquid crystal molecule LM rotates in a plane parallel to the X-Y plane. In this example, each of the first alignment treatment direction PD1 and the second alignment treatment direction PD2 is substantially parallel to the second direction Y. At the OFF time, the liquid crystal molecule LM is initially aligned such that the major axis thereof is substantially parallel to the second direction Y, as indicated by a broken line in FIG. 3.

When the first alignment treatment direction PD1 and the second alignment treatment direction PD2 are parallel and identical to each other, as in the example illustrated, the liquid crystal molecules LM are substantially horizontally aligned (the pre-tilt angle is substantially zero) in the middle part of the liquid crystal layer LQ in the cross section of the liquid crystal layer LQ, and the liquid crystal molecules LM are aligned with such pre-tilt angles that the liquid crystal molecules LM become symmetric in the vicinity of the first alignment film AL1 and in the vicinity of the second alignment film AL2, with respect to the middle part as the boundary (splay alignment). In the state in which the liquid crystal molecules LM are splay-aligned, optical compensation can be made by the liquid crystal molecules LM in the vicinity of the first alignment film AL1 and the liquid crystal molecules LM in the vicinity of the second alignment film AL2, even in a direction inclined to the normal direction of the substrate. Therefore, when the first alignment treatment direction PD1 and the second alignment treatment direction PD2 are parallel and identical to each other, light leakage is small in the case of black display, a high contrast ratio can be realized, and the display quality can be improved. In the meantime, when the first alignment treatment direction PD1 and the second alignment treatment direction PD2 are parallel and opposite to each other, the liquid crystal molecules LM are aligned with substantially equal pre-tilt angles, in the cross section of the liquid crystal layer LQ, in the vicinity of the first alignment film AL1, in the vicinity of the second alignment film AL2, and in the middle part of the liquid crystal layer LQ (homogeneous alignment).

Part of light from the backlight 4 passes through the first polarizer PL1, becomes linearly polarized light which is perpendicular to the first polarization axis AX1, and enters the liquid crystal display panel LPN. The polarization state of such linearly polarized light hardly varies when the light passes through the liquid crystal layer LQ at the OFF time. Thus, the linearly polarized light, which has passed through the liquid crystal display panel LPN, is absorbed by the second polarizer PL2 that is in the positional relationship of crossed Nicols in relation to the first polarizer PL1 (black display).

On the other hand, in a state in which a voltage is applied to the liquid crystal layer LQ, that is, in a state (ON time) in which an electric field is produced between the pixel electrode PE and common electrode CE, a lateral electric field (or an oblique electric field), which is substantially parallel to the substrates, is produced between the pixel electrode PE and the common electrode CE. The liquid crystal molecules LM are affected by the electric field, and the major axes thereof rotate within a plane which is substantially parallel to the X-Y plane, as indicated by solid lines in the Figure.

In the example shown in FIG. 3, in the pixel PX, the liquid crystal molecule LM in a lower-side region between the main pixel electrode PA1 and main common electrode CAC rotates counterclockwise relative to the second direction Y, and is aligned in a lower right direction in the Figure, and the liquid crystal molecule LM in an upper-side region between the main pixel electrode PA1 and main common electrode CAC rotates clockwise relative to the second direction Y, and is aligned in an upper right direction in the Figure. In addition, the liquid crystal molecule LM in a lower-side region between the main pixel electrode PA2 and main common electrode CAC rotates clockwise relative to the second direction Y, and is aligned in a lower left direction in the Figure, and the liquid crystal molecule LM in an upper-side region between the main pixel electrode PA2 and main common electrode CAC rotates counterclockwise relative to the second direction Y, and is aligned in an upper left direction in the Figure.

As has been described above, in the state in which the electric field is produced between the pixel electrode PE and common electrode CE in each pixel PX, the liquid crystal molecules LM are aligned in a plurality of directions, with boundaries at positions overlapping the main pixel electrodes PA or at positions overlapping the main common electrodes CA, and domains are formed in the respective alignment directions. Specifically, a plurality of domains are formed in one pixel PX.

At such ON time, part of backlight, which is incident on the liquid crystal display panel LPN from the backlight 4, passes through the first polarizer PL1, becomes linearly polarized light which is perpendicular to the first polarization axis AX1, and enters the liquid crystal display panel LPN. The polarization state of such linearly polarized light varies depending on the alignment state of the liquid crystal molecules LM when the light passes through the liquid crystal layer LQ. For example, when linearly polarized light, which is parallel to the first direction X, has entered the liquid crystal display panel LPN, the light is affected, while passing through the liquid crystal layer LQ, by a retardation of $\lambda/2$ by the liquid crystal molecules LM which are aligned in a 45°-225° azimuth direction or a 135°-315° azimuth direction relative to the first direction X ($\lambda$ is a wavelength of light passing through the liquid crystal layer LQ). Thereby, the polarization state of the light, which has passed through the liquid crystal layer LQ, becomes linear polarization parallel to the second direction Y. Thus, at the ON time, at least part of the light emerging from the liquid crystal layer LQ passes through the second polarizer PL2 (white display). However, at a position overlapping the pixel electrode or common electrode, since the liquid crystal molecules maintain the initial alignment state, black display is effected as in the case of the OFF time.

According to the present embodiment, in the pixel electrode PE, the contact portion PC, which is in contact with the switching element SW, is located immediately above the storage capacitance line C1 which crosses a substantially central portion of the pixel PX. The liquid crystal molecules are driven by using the electric field which is produced between the main pixel electrode PA, which is continuous with the contact portion PC, and the main common electrode CA. Thus, in one pixel PX, transmissive regions, which contribute to display, can be formed in regions on both sides of the contact portion PC, that is, in the region located on the gate line G1 side and the region located on the gate line G2 side. Therefore, in one pixel PX, the useless space, which cannot be used for display, can be reduced.

In a comparative example, such a layout is adopted that the contact portion PC is disposed close to the switching element SW. In this layout, the storage capacitance line C, which is located immediately below the contact portion PC, is positioned close to the gate electrode WG of the switching element SW or the gate line G. However, since both are formed in the same layer and need to be electrically insulated, a sufficient margin (a margin of 10 μm or more in the above example) needs to be secured therebetween. Thus, a useless space, which is hardly usable for display, occurs between the switching element SW and the contact portion PC or pixel electrode PE. According to the present embodiment, compared to the layout of this comparative example, the area of the transmissive region, which substantially contributes to display, can be increased, even if the area of one pixel PX is the same.

According to the embodiment, in the pixel electrode PE, the distances from the contact position PP to the respective main pixel electrodes PA can be made equal, and degradation in display quality due to a difference in resistance between the main pixel electrodes PA can be suppressed. The contact position PP is located at a substantially central portion of the pixel PX or at a substantially central portion of the pixel electrode PE, or is equidistant from the source line S1 and source line S2. Thus, even in the case where the second pitch between the source lines S is varied according to specifications, the distance from the contact position PP to each main pixel electrode PA does not become non-uniform, and products with various pixel pitches can be provided.

According to the present embodiment, a high transmittance can be obtained in the inter-electrode gap between the pixel electrode PE and the common electrode CE. In addition, a transmittance per pixel can be increased by increasing the inter-electrode distance between the main pixel electrode PA and the main common electrode CA. Besides, as regards product specifications in which the pixel pitch is different, for example, it is possible to make use of a peak condition of a transmittance distribution by varying the inter-electrode distance between the main pixel electrode PA and main common electrode CA. Specifically, in the display mode of the present embodiment, products with various pixel pitches can be provided by setting the inter-electrode distance, without necessarily requiring fine electrode processing, as regards the product specifications from low-resolution product specifications with a relatively large pixel pitch to high-resolution product specifications with a relatively small pixel pitch.

According to the present embodiment, in the region overlapping the common electrode CE, the transmittance is sufficiently lowered. The reason for this is that the electric field does not leak to the outside of the pixel from the positions of the common electrodes CE which are located immediately above the gate lines G and source lines S, and an undesired lateral electric field does not occur between pixels which neighbor each other, and therefore the liquid crystal molecules LM in the region overlapping the common electrode CE keep the initial alignment state, like the case of the OFF time (or black display time). Accordingly, even when the colors of the color filters CF are different between pixels which neighbor each other with the gate line G or source line S interposed, the occurrence of color mixture can be suppressed, and the decrease in color reproducibility or the decrease in contrast ratio can be suppressed. In addition, when misalignment has occurred between the array substrate AR and the counter-substrate CT, there is such a case that a difference occurs in inter-electrode distance between the pixel electrode PE and the common electrodes CE on both sides of the pixel electrode PE. However, since such a difference occurs commonly in all pixels PX, the electric field distribution does not differ between the pixels PX, and the influence on the display of images can be reduced.

In addition, the pixel electrode PE of the array substrate AR, when viewed on the X-Y plane of one pixel, is disposed within the inside of the common electrode CE that is disposed on the counter-substrate CT. In other words, in one pixel PX, the pixel electrode PE is surrounded by the common electrode CE. By this arrangement, electric force lines have their starting point and end point within one pixel, and the electric force lines in this pixel do not leak to a neighboring pixel. Thus, for example, electric fields, which are applied to the liquid crystal layer LQ, do not affect each other between pixels PX which neighbor in the first direction X. Therefore, the liquid crystal molecules LM in the pixel do not move due to the effect of the electric field from the neighboring pixel, and the degradation in display quality can be suppressed.

According to the present embodiment, a plurality of domains can be formed in one pixel. Thus, the viewing angle can be optically compensated in plural directions, and the viewing angle can be increased. In the example illustrated in FIG. 3, four domains can be formed within one pixel and these four domains have substantially equal areas. Therefore, further viewing angle compensation can be made.

The above-described example is directed to the case where the initial alignment direction of liquid crystal molecules LM is parallel to the second direction Y. However, the initial alignment direction of liquid crystal molecules LM may be an oblique direction which obliquely crosses the first direction X and second direction Y.

The above-described example relates to the case in which the liquid crystal layer LQ is composed of a liquid crystal material having a positive (positive-type) dielectric constant anisotropy. Alternatively, the liquid crystal layer LQ may be composed of a liquid crystal material having a negative (negative-type) dielectric constant anisotropy.

Since a lateral electric field is hardly produced over the pixel electrode PE or common electrode CE even at the ON time (or an electric field enough to drive liquid crystal molecules LM is not produced), the liquid crystal molecules LM scarcely move from the initial alignment direction, like the case of the OFF time. Thus, even if the pixel electrode PE and common electrode CE are formed of a light-transmissive, electrically conductive material such as ITO, little backlight passes through these regions, and these regions hardly contribute to display at the ON time. Thus, the pixel electrode PE and common electrode CE do not necessarily need to be formed of a transparent, electrically conductive material, and may be formed of an opaque, electrically conductive material such as aluminum (Al), titanium (Ti), silver (Ag), molybdenum (Mo), tungsten (W), or chromium (Cr).

In addition, even at the ON time, backlight hardly passes through the region overlapping the pixel electrode PE. Thus, even in the structure in which a part of the pixel electrode PE and the storage capacitance line C overlap to form a capacitance, the area of the substantial transmissive region is not decreased. Specifically, according to the present embodiment in which the capacitance is formed by the main pixel electrode PA, contact portion PC and storage capacitance line C, the capacitance that is necessary for display in the pixel PX can be secured, without decreasing the area of the transmissive region.

Furthermore, since the main common electrode CA is partly located above the source line S that does not contribute to display, the area of the substantial transmissive region is not decreased.

Since the drain electrode WD of the switching element SW is located immediately below the main common electrode CA that does not contribute to display, the area of the substantial transmissive region is not decreased. In the meantime, the width in the second direction Y of the drain electrode WD up to the contact position PP can be increased within the range overlapping the main common electrode CAC in the X-Y plane. In this case, the area of the transmissive region does not decrease due to the increase in width of the drain electrode WD.

The above-described example relates to the structure in which one pixel electrode PE includes two main pixel electrodes PA. However, the structure is not limited to this example. When the number of main pixel electrodes PA, which are included in one pixel electrode PE, is a, the number of main common electrodes CA, which are disposed in one pixel, is (a+1), and one main pixel electrode PA is disposed between neighboring main common electrodes CA (a is a positive integer).

In the present embodiment, the structure of the pixel PX is not limited to the above-described example.

FIG. 6 is a plan view which schematically shows another structure example of the pixel PX at a time when the array substrate AR shown in FIG. 1 is viewed from the counter-substrate side.

The structure example illustrated in FIG. 6 differs from the structure example shown in FIG. 2 in that the pixel electrode PE is formed in a loop shape. Specifically, the pixel electrode PE includes a plurality of main pixel electrodes PA, a contact portion PC, and connection portions PD. The main pixel electrodes PA, contact portion PC, and connection portions PD are electrically connected to each other.

The connection portions PD extend in the first direction X, and connect the main pixel electrodes PA. The connection portion PD is formed in a strip shape with a substantially uniform width in the second direction Y. In the example illustrated, on the gate line G1 side of the pixel PX, a connection portion PD1 connects one end portion of the main pixel electrode PA1 and one end portion of the main pixel electrode PA2. In addition, on the gate line G2 side of the pixel PX, a connection portion PD2 connects the other end portion of the main pixel electrode PA1 and the other end portion of the main pixel electrode PA2. The contact portion PC is located at a substantially middle point between the connection portion PD1 and connection portion PD2. The pixel electrode PE with this structure is formed in a shape of numeral "8".

The array substrate AR including this pixel electrode PE can be combined with the counter-substrate CT including the common electrode CE shown in FIG. 3.

According to this structure example, since the pixel electrode PE is formed in a loop shape, redundancy can be improved. Specifically, even if breakage occurs in a part of the pixel electrode PE, a pixel potential can be supplied to each main pixel electrode PA via a path extending through the contact portion PC, a path extending through the connection portion PD1 and a path extending through the connection portion PD2. Therefore, even if the width of the pixel electrode PE becomes extremely small in accordance with a demand for higher fineness, it is possible to suppress degradation in display quality, such as a display defect due to breakage of a part of the pixel electrode PE in the pixel PX.

In addition, in the example illustrated, the storage capacitance line C1 is located immediately below the contact portion PC. However, the storage capacitance line C1 may extend immediately below the main pixel electrode PA, and may also be located immediately below the connection portions PD and formed in a loop shape immediately below the pixel electrode PE. In this case, by adopting such a layout that the storage capacitance line C1 does not protrude from the pixel electrode PE, a greater capacitance can be obtained without decreasing the area of the transmissive region. Besides, by forming the storage capacitance line in a loop shape immediately below the pixel electrode PE, redundancy can also be improved with respect to the storage capacitance line C1, and even if breakage occurs in a part of the storage capacitance line C1, a storage capacitance voltage can be applied to the entirety of the storage capacitance line C1. Therefore, degradation in display quality, such as a display defect, can be suppressed in each of pixels PX which are connected to the same storage capacitance line C.

Figure 7:
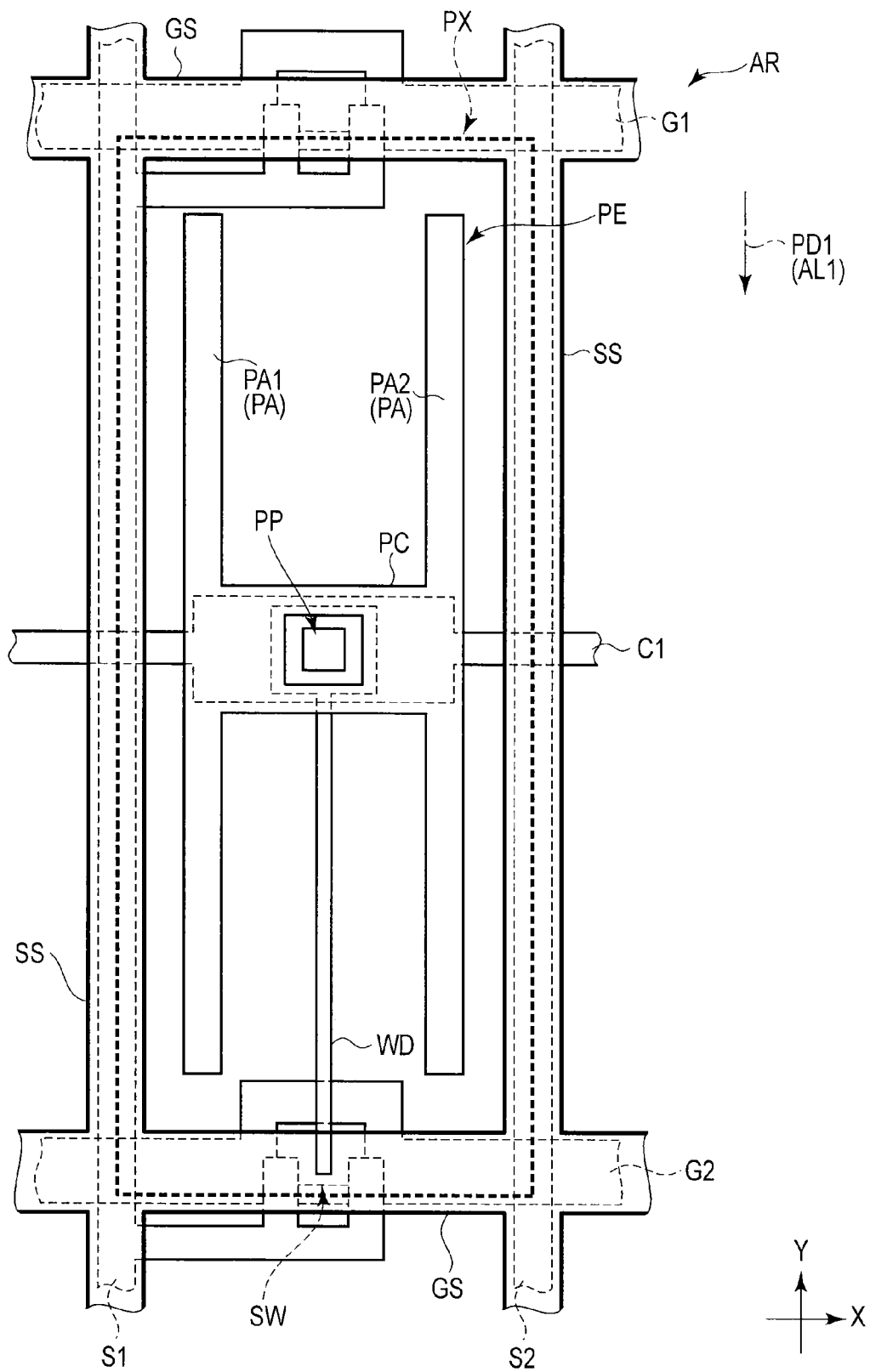
FIG. 7 is a plan view which schematically shows another structure example of the pixel at a time when the array substrate shown in FIG. 1 is viewed from the counter-substrate side.

FIG. 7 is a plan view which schematically shows another structure example of the pixel PX at a time when the array substrate AR shown in FIG. 1 is viewed from the counter-substrate side.

The structure example illustrated in FIG. 7 differs from the structure example shown in FIG. 2 in that the array substrate AR includes a gate shield electrode GS and a source shield electrode SS.

Specifically, the gate shield electrode GS is opposed to each of the gate line G1 and gate line G2 (or the gate shield electrode GS is located immediately above each of the gate line G1 and gate line G2). The gate shield electrode GS linearly extends in the first direction X, and is formed in a strip shape. The width of the gate shield electrode GS in the second direction Y may not necessarily be uniform. The gate shield electrode GS is electrically connected to the common electrode CE, and has the same potential as the common electrode CE.

The source shield electrode SS is opposed to each of the source line S1 and source line S2 (or the source shield electrode SS is located immediately above each of the source line S1 and source line S2). The source shield line SS linearly extends in the second direction Y, and is formed in a strip shape. The width of the source shield electrode SS in the first direction X may not necessarily be uniform. The source shield electrode SS is electrically connected to the common electrode CE, and has the same potential as the common electrode CE. In the example illustrated, the gate shield electrode GS and source shield electrode SS are formed integral or continuous with each other. Specifically, in the array substrate AR, the pixel electrode PE is located in an inside area surrounded by the gate shield electrode GS and source shield electrode SS, which have the same potential as the common electrode CE.

Since the gate shield electrode GS and source shield electrode SS are formed on an upper surface of the third insulation film 13, that is, in the same layer as the pixel electrode PE, the gate shield electrode GS and source shield electrode SS can be formed of the same material (e.g. ITO) as the pixel electrode PE. However, the gate shield electrode GS and source shield electrode SS are spaced apart from the pixel electrode PE.

When the array substrate AR of this structure example is combined with the counter-substrate CT shown in FIG. 3, the gate shield electrode GS is opposed to the sub-common electrode CB, and the source shield electrode SS is opposed to the main common electrode CA.

According to this structure example, since the gate shield electrode GS is opposed to the gate line G, an undesired electric field from the gate line G can be shielded. It is thus possible to suppress application of an undesired bias from the gate line G to the liquid crystal layer LQ, and to suppress the occurrence of a display defect such as burn-in, and the occurrence of light leakage due to an alignment defect of liquid crystal molecules.

Moreover, since the source shield electrode SS is opposed to the source line S, an undesired electric field from the source line S can be shielded. It is thus possible to suppress application of an undesired bias from the source line S to the liquid crystal layer LQ, and to suppress the occurrence of a display defect such as crosstalk (e.g. a phenomenon that when a pixel potential for displaying white is supplied to the source line that is connected to the pixel PX in the state in which the pixel PX is set at a pixel potential for displaying black, light leaks from a part of the pixel PX and the brightness increases).

Besides, since the gate shield electrode GS and source shield electrode SS, which are provided on the array substrate AR, are electrically connected and formed in a grid shape on the array substrate AR, redundancy can be improved. In addition, since the main common electrodes CA and sub-common electrodes CB, which are provided on the counter-substrate CT, are electrically connected and formed in a grid shape, redundancy can be improved. Since the gate shield electrode GS and source shield electrode SS and the main common electrodes CA and sub-common electrodes CB are electrically connected to each other, even if breakage occurs in a part of these electrodes, the common potential can stably be supplied to each pixel PX, and the occurrence of a display defect can be suppressed.

Next, other structure examples are described.

In the structure examples to be described below, the pixel electrode PE is formed of an opaque wiring material or an electrically conductive material with a light-blocking property or reflectivity. For example, the pixel electrode PE is formed of at least one metallic material selected from among aluminum (Al), titanium (Ti), silver (Ag), molybdenum (Mo), tungsten (W), copper (Cu) and chromium (Cr), or an alloy including any one of these materials.

On the other hand, the common electrode CE may be formed of a light-transmissive, electrically conductive material as in the above-described structure examples, or may be formed of the same opaque wiring material as the pixel electrode PE.

Figure 8:
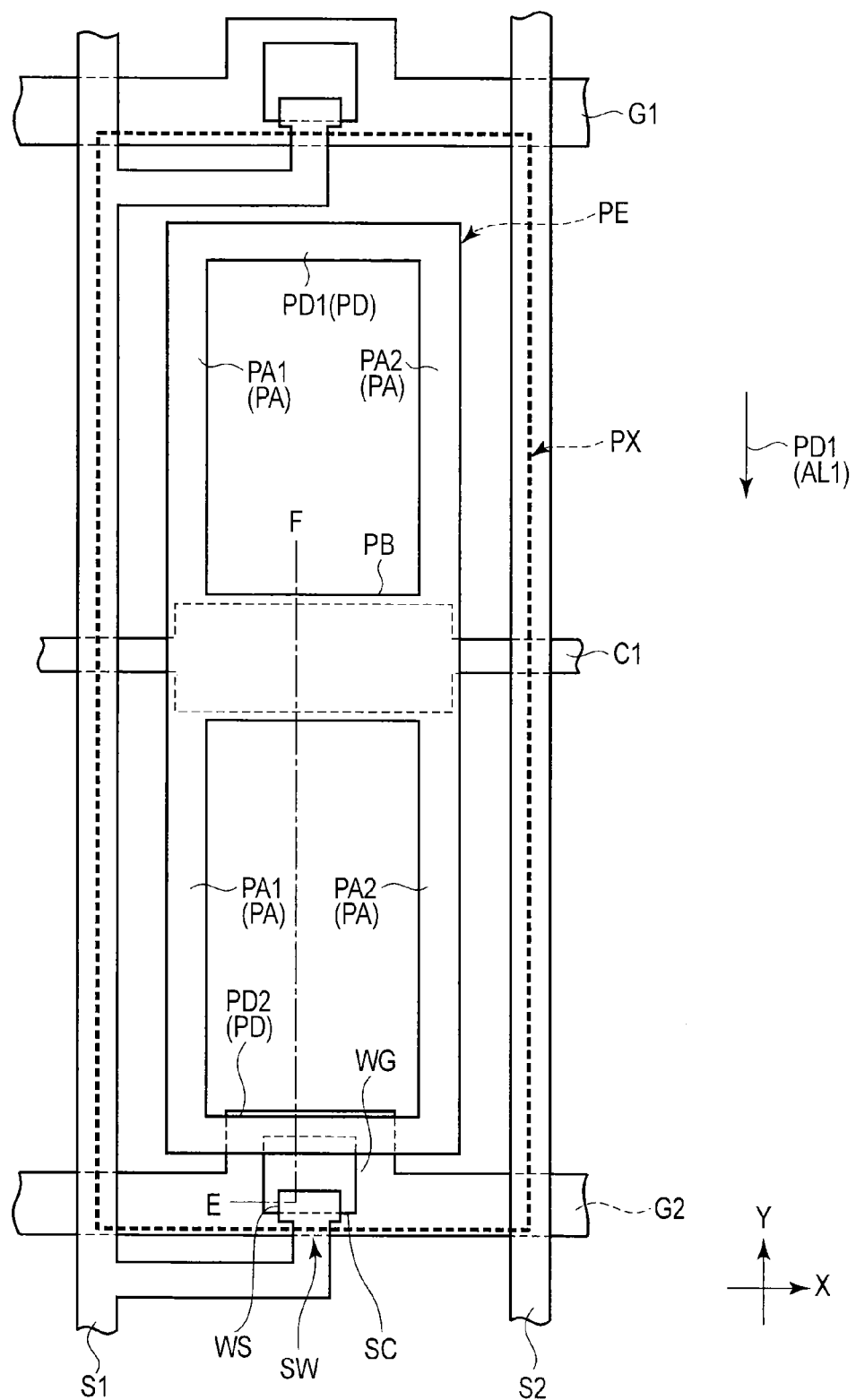
FIG. 8 is a plan view which schematically shows another structure example of the pixel at a time when the array substrate shown in FIG. 1 is viewed from the counter-substrate side.

FIG. 8 is a plan view which schematically shows a structure example of the pixel PX at a time when the array substrate AR shown in FIG. 1 is viewed from the counter-substrate side. FIG. 8 is a plan view in the X-Y plane.

The example illustrated differs from the example shown in FIG. 6 in that the pixel electrode PE is put in contact with the semiconductor layer SC, and functions also as a drain electrode of the switching element SW.

Specifically, the switching element SW includes a gate electrode WG which is electrically connected to the gate line G2, a semiconductor layer SC, and a source electrode WS which is electrically connected to the source line S1 and is put in contact with the semiconductor layer SC. In the example illustrated, that part of the source electrode WS, which is in contact with the semiconductor layer SC, extends in the first direction X.

Like the above-described examples, the pixel electrode PE is located within an inside surrounded by the source line S1, source line S2, gate line G1 and gate line G2. The pixel electrode PE includes main pixel electrodes PA, a sub-pixel electrode PB and connection portions PD. The main pixel electrodes PA, sub-pixel electrode PB and connection portions PD are formed integral or continuous with each other, and are electrically connected to each other.

The sub-pixel electrode PB is located at a substantially central portion of the pixel PX, and extends in the first direction X. The sub-pixel electrode PB is formed in a strip shape having a substantially uniform width in the second direction Y. Two or more main pixel electrodes PA are provided in one pixel electrode PE. The main pixel electrodes PA extend in the second direction Y from the sub-pixel electrode PB. Each main pixel electrode PA is formed in a strip shape having a substantially uniform width in the first direction X.

In the example illustrated, the pixel electrode PE includes two main pixel electrodes, namely a main pixel electrode PA1 and a main pixel electrode PA2. The main pixel electrode PA1 is located on the source line S1 side of the sub-pixel electrode PB, and is continuous with the sub-pixel electrode PB. The main pixel electrode PA2 is located on the source line S2 side of the sub-pixel electrode PB, and is continuous with the sub-pixel electrode PB. The main pixel electrode PA1 and main pixel electrode PA2 linearly extend in the second direction Y from the sub-pixel electrode PB toward an upper side end portion of the pixel PX (i.e. toward the gate line G1) and a lower side end portion of the pixel PX (i.e. toward the gate line G2), respectively. As regards the main pixel electrode PA1, the length of extension from the sub-pixel electrode PB toward the gate line G1 is substantially equal to the length of extension from the sub-pixel electrode PB toward the gate line G2. Similarly, as regards the main pixel electrode PA2, the length of extension from the sub-pixel electrode PB toward the gate line G1 is substantially equal to the length of extension from the sub-pixel electrode PB toward the gate line G2. Specifically, the sub-pixel electrode PB connects a substantially middle position of the main pixel electrode PA1 and a substantially middle position of the main pixel electrode PA2.

The connection portions PD extend in the first direction X, and connect the main pixel electrodes PA. The connection portion PD is formed in a strip shape with a substantially uniform width in the second direction Y. In the example illustrated, on the gate line G1 side of the pixel PX, a connection portion PD1 connects one end portion of the main pixel electrode PA1 and one end portion of the main pixel electrode PA2. In addition, on the gate line G2 side of the pixel PX, a connection portion PD2 connects the other end portion of the main pixel electrode PA1 and the other end portion of the main pixel electrode PA2. The sub-pixel electrode PB is located at a substantially middle point between the connection portion PD1 and connection portion PD2. The connection portion PD2 is put in contact with the semiconductor layer SC, and has the same function as the drain electrode of the switching element SW. In the example illustrated, that part of the connection portion PD2, which is in contact with the semiconductor layer SC, extends in the first direction X, and is parallel to that part of the source electrode WS, which is in contact with the semiconductor layer SC. The pixel electrode PE with this structure is formed in a shape of numeral "8". Specifically, the pixel electrode PE is formed in a loop shape. However, the connection portion PD1 may be omitted.

In this pixel electrode PE, the sub-pixel electrode PB is located immediately above the storage capacitance line C1 at a substantially central portion of the pixel PX. Specifically, the pixel electrode PE is opposed to the storage capacitance line C1 at the sub-pixel electrode PB, and forms a capacitance which is necessary for image display in the pixel PX. In the meantime, in order to form a greater capacitance, a part of the main pixel electrode PA, in addition to the sub-pixel electrode PB, may be located above the storage capacitance line C1.

In the meantime, the source line S and pixel electrode PE are formed in the same layer and need to be electrically insulated, and thus a margin of, e.g. 10 μm is secured therebetween.

FIG. 9 is a plan view which schematically shows a structure example of the pixel PX in the counter-substrate CT shown in FIG. 1. The counter-substrate CT, which can be combined with the array substrate AR shown in FIG. 8, has the same structure as the counter-substrate CT which includes the common electrode CE shown in FIG. 3.

Specifically, the common electrode CE includes a main common electrode CAL which is disposed above the source line S1, a main common electrode CAR which is disposed above the source line S2, a main common electrode CAC which is disposed between the main pixel electrode PA1 and main pixel electrode PA2, a sub-common electrode CBU which is disposed above the gate line G1, and a sub-common electrode CBB which is disposed above the gate line G2.

Figure 10:
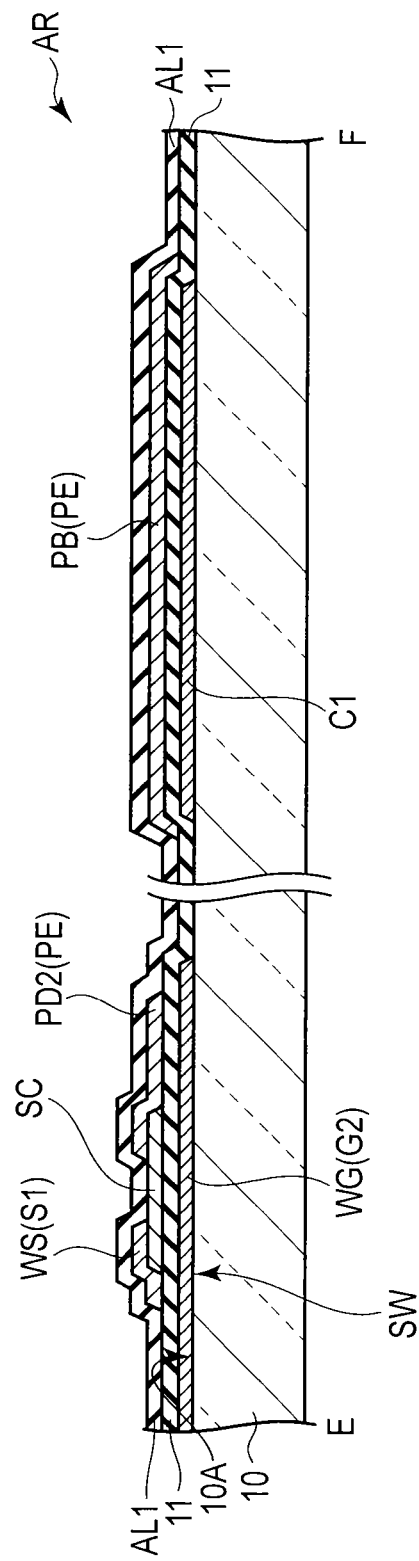
FIG. 10 is a schematic cross-sectional view, taken along line E-F in FIG. 8, showing a cross-sectional structure of the array substrate shown in FIG. 8.

FIG. 10 is a schematic cross-sectional view, taken along line E-F in FIG. 8, showing a cross-sectional structure of the array substrate shown in FIG. 8.

The array substrate AR includes, on the first insulative substrate 10, a switching element SW, a storage capacitance line C1, a pixel electrode PE, a first insulation film 11, and a first alignment film AL1. The pixel electrode PE is formed on the first insulation film 11. The connection portion PD2, which is a part of the pixel electrode PE, is put in contact with the semiconductor layer SC. In addition, the sub-pixel electrode PB, which is a part of the pixel electrode PE, is located immediately above the storage capacitance line C1. Specifically, the sub-pixel electrode PB is opposed to the storage capacitance line C1 via the first insulation film 11. The source electrode WS and pixel electrode PE are formed of the same material as the source line. The first alignment film AL1 covers the semiconductor layer SC and source electrode WS, which constitute the switching element SW, and the pixel electrode PE, and is also disposed over the first insulation film 11. In the meantime, the switching element SW and pixel electrode PE may be covered with another insulation film such as a passivation film.

Figure 11:
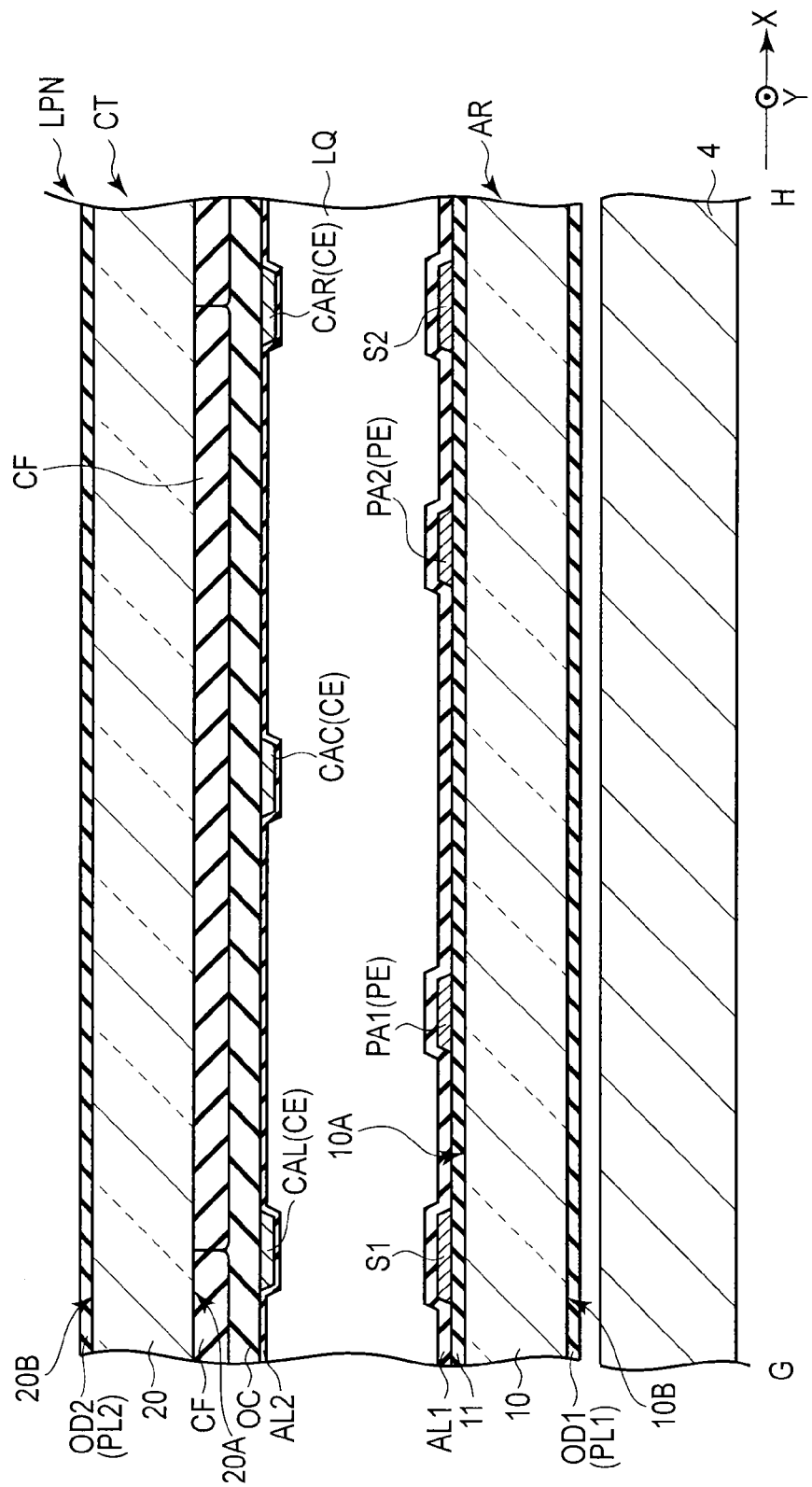
FIG. 11 is a schematic cross-sectional view, taken along line G-H in FIG. 9, showing a cross-sectional structure of a liquid crystal display panel shown in FIG. 9.

FIG. 11 is a schematic cross-sectional view, taken along line G-H in FIG. 9, showing a cross-sectional structure of the liquid crystal display panel LPN shown in FIG. 9.

In the array substrate AR, the source line S1 and source line S2 are formed on the first insulation film 11 and are covered with the first alignment film AL1. The main pixel electrode PA1 and main pixel electrode PA2 of the pixel electrode PE are formed on the first insulation film 11 and are covered with the first alignment film AL1. The main pixel electrode PA1 and main pixel electrode PA2 are spaced apart from the source line S1 and source line S2, and are located between the source line S1 and source line S2. The first alignment film AL1 is disposed on that surface of the array substrate AR, which is opposed to the counter-substrate CT, and the first alignment film AL1 extends over substantially the entirety of the active area ACT.

In the counter-substrate CT, the main common electrode CAL is located immediately above the source line S1. The main common electrode CAR is located immediately above the source line S2. The main common electrode CAC is located between the main common electrode CAL and main common electrode CAR or between the main pixel electrode PA1 and main pixel electrode PA2.

The regions between the pixel electrode PE and the common electrode CE, namely a region between the main common electrode CAL and main pixel electrode PA1, a region between the main common electrode CAC and main pixel electrode PA1, a region between the main common electrode CAC and main pixel electrode PA2 and a region between the main common electrode CAR and main pixel electrode PA2, correspond to transmissive regions through which light can pass.

At the ON time, in the pixel PX, the liquid crystal molecule LM in a lower-side region between the main pixel electrode PA1 and main common electrode CAC rotates counterclockwise relative to the second direction Y, and is aligned in a lower right direction in the Figure, and the liquid crystal molecule LM in an upper-side region between the main pixel electrode PA1 and main common electrode CAC rotates clockwise relative to the second direction Y, and is aligned in an upper right direction in the Figure. In addition, the liquid crystal molecule LM in a lower-side region between the main pixel electrode PA2 and main common electrode CAC rotates clockwise relative to the second direction Y, and is aligned in a lower left direction in the Figure, and the liquid crystal molecule LM in an upper-side region between the main pixel electrode PA2 and main common electrode CAC rotates counterclockwise relative to the second direction Y, and is aligned in an upper left direction in the Figure.

In this manner, at the ON time, a plurality of domains are formed in one pixel PX.

In the structure example illustrated in FIG. 8 to FIG. 11, the same advantageous effects as in the above-described structure examples can be obtained.

In addition, the pixel electrode PE is formed of an electrically conductive material in which no indium (In) is used. Thus, compared to the case in which both the pixel electrode PE and common electrode CE are formed of ITO or IZO, the amount of use of indium can be reduced. Moreover, an indium-free structure can be realized in the case where indium (In) is used neither in the pixel electrode PE nor in the common electrode CE.

Besides, since a lateral electric field is hardly produced over the pixel electrode PE or common electrode CE even at the ON time, as well as at the OFF time (or an electric field enough to drive liquid crystal molecules LM is not produced), the liquid crystal molecules LM scarcely move from the initial alignment direction. Thus, even if the pixel electrode PE and common electrode CE are formed of a light-transmissive, electrically conductive material such as ITO, little backlight passes through these regions at the ON time, and these regions hardly contribute to display at the ON time. Specifically, even if the pixel electrode PE and common electrode CE are formed of the above-described opaque, electrically conductive material, as in the present embodiment, a decrease in transmittance at the ON time or a decrease in area of the transmissive region that substantially contributes to display can be suppressed, compared to the case where the pixel electrode PE and common electrode CE are formed of the transparent, electrically conductive material.

In the present embodiment in which the pixel electrode PE is formed of the above-described opaque, electrically conductive material, linearly polarized light, which has entered the liquid crystal display panel LPN, is substantially parallel or substantially perpendicular to the direction of extension of the edges of the pixel electrode PE. In addition, the direction of extension of the gate line G, storage capacitance line C and source line S, which are formed of the above-described opaque, electrically conductive material, is substantially parallel or substantially perpendicular to the linearly polarized light which has entered the liquid crystal display panel LPN. In addition, there is a case in which the common electrode CE is also formed of the above-described opaque, electrically conductive material, and the direction of extension of the common electrode CE is substantially parallel or substantially perpendicular to the linearly polarized light which has entered the liquid crystal display panel LPN. Thus, the plane of polarization of the linearly polarized light, which is reflected by the edges of the pixel electrode PE or common electrode CE, the gate line G, storage capacitance line C and source line S, is hardly disturbed, and the plane of polarization at the time of passing through the first polarizer PL1, which is a polarizer, can be maintained. Accordingly, at the OFF time, since linearly polarized light, which has passed through the liquid crystal display panel LPN, is sufficiently absorbed by the second polarizer PL2, which is an analyzer, light leakage can be suppressed. Specifically, the transmittance can be sufficiently reduced at the time of black display, and the decrease in contrast ratio can be suppressed. In addition, since there is no need to increase the width of a black matrix in order to cope with light leakage in the vicinity of the pixel electrode PE or common electrode CE, it is possible to suppress a decrease in area of the transmissive region or a decrease in transmittance at the ON time. Therefore, degradation in display quality can be suppressed.

According to the embodiment, the pixel electrode PE can be formed of the same material as the source line S which is formed in the same layer. Thus, in the fabrication step of forming the source line S, the pixel electrode PE can be formed at the same time. Specifically, such a fabrication step as forming the pixel electrode PE separately from the drain electrode of the switching element SW can be omitted. Therefore, the manufacturing cost can be reduced.

According to this embodiment, the pixel electrode PE is put in direct contact with the semiconductor layer SC, not through a contact hole in the insulation film, and the pixel electrode PE functions as the drain electrode of the switching element SW. Thus, the occurrence of disordered alignment of liquid crystal molecules LM due to asperities of the contact hole can be suppressed. Thereby, light leakage at the OFF time can be suppressed and the contrast ratio can be improved.

According to the present embodiment, the storage capacitance line C1, which crosses a substantially central portion of the pixel PX, is provided, and the sub-pixel electrode PB of the pixel electrode PE is located immediately above the storage capacitance line C1 at the substantially central portion of the pixel PX. In addition, the liquid crystal molecules are driven by using the electric field which is produced between the main pixel electrode PA, which is continuous with the sub-pixel electrode PB and connection portion PD, and the main common electrode CA. Thus, in one pixel PX, transmissive regions, which contribute to display, can be formed in an upper region and lower region on both sides of the sub-pixel electrode PB, that is, in the region located on the gate line G1 side and the region located on the gate line G2 side. Therefore, in one pixel PX, the useless space, which cannot be used for display, can be reduced.

According to the embodiment, in the connection portion PD2 of the pixel electrode PE, the distances from the contact position of contact with the semiconductor layer SC to the respective main pixel electrodes PA can be made equal, and degradation in display quality due to a difference in resistance between the main pixel electrodes PA can be suppressed. The contact position is equidistant from the source line S1 and source line S2. Thus, even in the case where the second pitch between the source lines S is varied according to specifications, the distance from the contact position to each main pixel electrode PA does not become non-uniform, and products with various pixel pitches can be provided.

According to the embodiment, a capacitance is formed between the storage capacitance line C1 and pixel electrode PE, which are opposed to each other via the first insulation film 11. Specifically, the gap between the storage capacitance line C1 and pixel electrode PE corresponds to the film thickness of the first insulation film 11. Thus, with the structure of the present embodiment, a greater capacitance can be formed, compared to the case in which a capacitance is formed in the state in which a plurality of insulation films are interposed between the storage capacitance line C1 and pixel electrode PE.

According to this embodiment, since the pixel electrode PE is formed in a loop shape, redundancy can be improved. Specifically, even if breakage occurs in a part of the pixel electrode PE, a pixel potential can be supplied to each main pixel electrode PA via a path extending through the sub-pixel electrode PB, a path extending through the connection portion PD1 and a path extending through the connection portion PD2. Therefore, even if the width of the pixel electrode PE becomes extremely small in accordance with a demand for higher fineness, it is possible to suppress degradation in display quality, such as a display defect due to breakage of a part of the pixel electrode PE in the pixel PX.

In the above-described example, the storage capacitance line C1 is located immediately below the sub-pixel electrode PB. However, the storage capacitance line C1 may extend immediately below the main pixel electrode PA, and may also be located immediately below the connection portion PD1 and formed in a loop shape immediately below the pixel electrode PE. In this case, by adopting such a layout that the storage capacitance line C1 does not protrude from the pixel electrode PE, a greater capacitance can be obtained without decreasing the area of the transmissive region. Besides, by forming the storage capacitance line in a loop shape immediately below the pixel electrode PE, redundancy can also be improved with respect to the storage capacitance line C1, and even if breakage occurs in a part of the storage capacitance line C1, a storage capacitance voltage can be applied to the entirety of the storage capacitance line C1. Therefore, degradation in display quality, such as a display defect, can be suppressed in each of pixels PX which are connected to the same storage capacitance line C.

FIG. 12 is a plan view which schematically shows another structure example of the pixel at a time when the array substrate shown in FIG. 1 is viewed from the counter-substrate side.

The structure example illustrated in FIG. 12 differs from the structure example illustrated in FIG. 8 with respect to the structure of the switching element SW. Specifically, the source electrode WS, which is integral with the source line S1, extends in the second direction Y and includes portions put in contact with the semiconductor layer SC at two locations. The pixel electrode PE, which functions also as the drain electrode, includes a contact portion PC which is integral with the connection portion PD2. The contact portion PC extends in the second direction Y and is put in contact with the semiconductor layer SC between the portions of the source electrode WS. Even in the case where the switching element SW with this structure is applied, the same advantageous effects as in the above-described structure examples can be obtained.

As has been described above, according to the present embodiment, a liquid crystal display device, which can realize cost reduction and can suppress degradation in display quality, can be provided.

Next, other modes of the present embodiment are additionally described.

(1) A liquid crystal display device including:

a first substrate including a gate line and a storage capacitance line each extending in a first direction, a source line extending in a second direction crossing the first direction, a switching element which is electrically connected to the gate line and the source line, and a pixel electrode disposed in a pixel having a less length in the first direction than in the second direction, the pixel electrode including a contact portion which is located above the storage capacitance line at a substantially central portion of the pixel, extends in the first direction, and is put in contact with the switching element, and a first main pixel electrode and a second main pixel electrode which are continuous with the contact portion and extend in the second direction;

a second substrate including a common electrode including main common electrodes which are located between the first main pixel electrode and the second main pixel electrode, and above the source line, respectively, and extend in the second direction; and a liquid crystal layer including liquid crystal molecules held between the first substrate and the second substrate.

(2) The liquid crystal display device according to (1), wherein the first substrate further includes gate shield electrodes which are opposed to the gate line and have the same potential as the common electrode, and source shield electrodes which are opposed to the source line and have the same potential as the common electrode.

(3) A liquid crystal display device including:

a first substrate including a gate line and a storage capacitance line each extending in a first direction, a gate electrode formed integral with the gate line, an insulation film covering the gate line, the storage capacitance line and the gate electrode, a semiconductor layer formed on the insulation film and located immediately above the gate electrode, a source line formed on the insulation film and extending in a second direction crossing the first direction, a source electrode formed integral with the source line on the insulation film and put in contact with the semiconductor layer, and a pixel electrode formed on the insulation film and put in contact with the semiconductor layer, the pixel electrode including a sub-pixel electrode which is located above the storage capacitance line at a substantially central portion of a pixel and extends in the first direction, and a first main pixel electrode and a second main pixel electrode which are continuous with the sub-pixel electrode and extend in the second direction;

a second substrate including a common electrode including main common electrodes which are located between the first main pixel electrode and the second main pixel electrode, and above the source line, respectively, and extend in the second direction; and a liquid crystal layer including liquid crystal molecules held between the first substrate and the second substrate.

(4) The liquid crystal display device according to (3), wherein the pixel electrode is formed of the same material as the source electrode.

(5) The liquid crystal display device according to (3) or (4), wherein the pixel electrode further includes a connection portion which extends in the first direction and connects the first main pixel electrode and the second main pixel electrode, the pixel electrode is formed in a loop shape, and the connection portion is put in contact with the semiconductor layer.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A liquid crystal display device comprising:
a first substrate including a first gate line and a second gate line which extend in a first direction and are disposed with a first pitch along a second direction crossing the first direction, a storage capacitance line which is located at a substantially middle point between the first gate line and the second gate line and extends in the first direction, a first source line and a second source line which extend in the second direction and are disposed with a second pitch, which is less than the first pitch, along the first direction, a switching element which is electrically connected to the first gate line and the first source line, and a pixel electrode surrounded by the first gate line, the second gate line, the first source line and the second source line, the pixel electrode including a contact portion which is located above the storage capacitance line, is put in contact with the switching element and extends in the first direction, a first main pixel electrode which is continuous with a part of the contact portion, which is located on the first source line side, and extends in the second direction, and a second main pixel electrode which is continuous with a part of the contact portion, which is located on the second source line side, and extends in the second direction;
a second substrate including a common electrode including main common electrodes which are located between the first main pixel electrode and the second main pixel electrode, above the first source line, and above the second source line, respectively, and extend in the second direction; and
a liquid crystal layer including liquid crystal molecules held between the first substrate and the second substrate.

2. The liquid crystal display device of claim 1, wherein the switching element includes a gate electrode which is electrically connected to the first gate line, a source electrode which is electrically connected to the first source line, and a drain electrode which is electrically connected to the contact portion and extends in the second direction immediately below the main common electrode which is located between the first main pixel electrode and the second main pixel electrode.

3. The liquid crystal display device of claim 2, wherein in the contact portion, a contact position of contact with the drain electrode is equidistant from the first main pixel electrode and the second main pixel electrode in the first direction.

4. The liquid crystal display device of claim 1, wherein the common electrode includes sub-common electrodes which are located above the first gate line and above the second gate line, respectively, are continuous with the main common electrodes and extend in the first direction.

5. The liquid crystal display device of claim 1, wherein the pixel electrode further includes a connection portion which extends in the first direction and connects the first main pixel electrode and the second main pixel electrode, and the pixel electrode is formed in a loop shape.

6. The liquid crystal display device of claim 1, wherein the pixel electrode is formed on an insulation film which covers the switching element, and
the first substrate further includes gate shield electrodes which are formed on the insulation film, are opposed to the first gate line and the second gate line and have the same potential as the common electrode, and source shield electrodes which are formed on the insulation film, are opposed to the first source line and the second source line and have the same potential as the common electrode.

7. The liquid crystal display device of claim 6, wherein the gate shield electrodes and the source shield electrodes are formed of the same material as the pixel electrode.

8. A liquid crystal display device comprising:
a first substrate including a gate line and a storage capacitance line each extending in a first direction, a first insulation film covering the gate line and the storage capacitance line, a source line formed on the first insulation film and extending in a second direction crossing the first direction, a switching element electrically connected to the gate line and the source line, a second insulation film covering the source line and the switching element, a third insulation film covering the second insulation film, and a pixel electrode which is formed on the third insulation film and disposed in a pixel having a greater length in the second direction than in the first direction, the pixel electrode including a contact portion which is located above the storage capacitance line at a substantially central portion of the pixel, extends in the first direction, and is put in contact with the switching element via a first contact hole formed in the second insulation film and a second contact hole formed in the third insulation film, and a first main pixel electrode and a second main pixel electrode which are continuous with the contact portion and extend in the second direction;
a second substrate including a common electrode including main common electrodes which are located between the first main pixel electrode and the second main pixel electrode, and above the source line, respectively, and extend in the second direction; and
a liquid crystal layer including liquid crystal molecules held between the first substrate and the second substrate.

9. The liquid crystal display device of claim 8, wherein the first substrate further includes gate shield electrodes which are formed on the third insulation film, are opposed to the gate line and have the same potential as the common electrode, and source shield electrodes which are formed on the third insulation film, are opposed to the source line and have the same potential as the common electrode.

10. The liquid crystal display device of claim 9, wherein in the contact portion, a contact position of contact with the switching element is equidistant from the first main pixel electrode and the second main pixel electrode in the first direction.

11. The liquid crystal display device of claim 8, wherein the common electrode includes sub-common electrodes which are located above the gate line, are continuous with the main common electrodes and extend in the first direction.

12. The liquid crystal display device of claim 8, wherein the pixel electrode further includes a connection portion which extends in the first direction and connects the first main pixel electrode and the second main pixel electrode, and the pixel electrode is formed in a loop shape.

13. A liquid crystal display device comprising:
a first substrate including a first gate line and a second gate line which extend in a first direction, a storage capacitance line which is located at a substantially middle point between the first gate line and the second gate line and extends in the first direction, a first source line and a second source line which extend in a second direction crossing the first direction, and a pixel electrode formed of the same material as the first source line and the second source line, the pixel electrode including a sub-pixel electrode which is located above the storage capacitance line and extends in the first direction, a first main pixel electrode which is continuous with a part of the sub-pixel electrode, which is located on the first source line side, and extends in the second direction, and a second main pixel electrode which is continuous with a part of the sub-pixel electrode, which is located on the second source line side, and extends in the second direction;
a second substrate including a common electrode including main common electrodes which are located between the first main pixel electrode and the second main pixel electrode, above the first source line, and above the second source line, respectively, and extend in the second direction; and
a liquid crystal layer including liquid crystal molecules held between the first substrate and the second substrate.

14. The liquid crystal display device of claim 13, wherein the first substrate further includes a semiconductor layer, a gate electrode which is electrically connected to the first gate line, and a source electrode which is put in contact with the semiconductor layer and is electrically connected to the first source line, and the pixel electrode is put in contact with the semiconductor layer.

15. The liquid crystal display device of claim 14, wherein the pixel electrode further includes a connection portion which extends in the first direction and connects the first main pixel electrode and the second main pixel electrode, and the pixel electrode is formed in a loop shape.

16. The liquid crystal display device of claim 15, wherein the connection portion is put in contact with the semiconductor layer.

17. The liquid crystal display device of claim 15, wherein the source electrode includes portions put in contact with the semiconductor layer at two locations, and
the pixel electrode further includes a contact portion which is put in contact with the semiconductor layer between the portions of the source electrode and is continuous with the connection portion.

18. The liquid crystal display device of claim 13, wherein the pixel electrode is formed of at least one metallic material selected from among metallic materials of aluminum (Al), titanium (Ti), silver (Ag), molybdenum (No), tungsten (W), copper (Cu) and chromium (Cr), or an alloy including any one of the metallic materials.

19. The liquid crystal display device of claim 13, wherein the pixel electrode is disposed in a pixel having a greater length in the second direction than in the first direction.

20. The liquid crystal display device of claim 13, wherein the common electrode includes sub-common electrodes which are located above the first gate line and above the second gate line, respectively, are continuous with the main common electrodes and extend in the first direction.

* * * * *